(12) United States Patent
Endo et al.

(10) Patent No.: US 12,662,076 B2
(45) Date of Patent: Jun. 23, 2026

(54) JOINT AND WORK VEHICLE

(71) Applicant: Kubota Corporation, Osaka (JP)

(72) Inventors: Yusuke Endo, Sakai (JP); Yumi Kushimoto, Sakai (JP); Yuki Monde, Sakai (JP)

(73) Assignee: Kubota Corporation, Osaka (JP)

( * ) Notice: Subject to any disclaimer, the term of this patent is extended or adjusted under 35 U.S.C. 154(b) by 940 days.

(21) Appl. No.: 17/832,216

(22) Filed: Jun. 3, 2022

(65) Prior Publication Data

US 2023/0091826 A1 Mar. 23, 2023

(30) Foreign Application Priority Data

Sep. 21, 2021 (JP) ................................. 2021-153446

(51) Int. Cl.
B60R 21/13 (2006.01)
F16B 7/04 (2006.01)

(52) U.S. Cl.
CPC .............. B60R 21/13 (2013.01); F16B 7/044 (2013.01)

(58) Field of Classification Search
None
See application file for complete search history.

(56) References Cited

U.S. PATENT DOCUMENTS 5,439,309 A * 8/1995 Raz ........................ E04B 1/1903
403/317
7,578,523 B2 * 8/2009 Kosuge ................ B62D 21/186
296/29

| 7,677,646 | B2 * | 3/2010 | Nakamura | ............. | B62D 33/06 |
| | | | | | 296/205 |
| 8,007,403 | B2 * | 8/2011 | Ishida | ................... | F16H 61/448 |
| | | | | | 477/68 |
| 8,827,357 | B2 * | 9/2014 | Kaku | ...................... | B60R 21/13 |
| | | | | | 296/190.03 |
| 9,045,104 | B2 * | 6/2015 | Kuroda | ................... | B60R 21/13 |
| 9,789,909 | B2 * | 10/2017 | Erspamer | ................. | B60J 10/86 |
| 10,232,699 | B2 * | 3/2019 | Oyama | .................... | B60K 6/26 |
| 10,618,489 | B2 * | 4/2020 | Hisamura | ............... | B60R 21/13 |
| 10,836,241 | B2 * | 11/2020 | Spitsnogle | ............. | B60J 5/0415 |
| 10,967,825 | B2 * | 4/2021 | Hisamura | ............ | B62D 27/065 |
| 11,014,419 | B2 * | 5/2021 | Danielson | ................ | B60N 3/04 |

(Continued)

FOREIGN PATENT DOCUMENTS

| JP | 2007245749 A | | 9/2007 |
| JP | 200967242 A | | 4/2009 |
| JP | 2009067242 A | * | 4/2009 |

*Primary Examiner* — Matthew R Mcmahon
(74) *Attorney, Agent, or Firm* — The Webb Law Firm

(57) ABSTRACT

A joint includes: a first coupling section configured to be coupled to an end of a first pipe; and a second coupling section configured to be coupled to an end of a second pipe. The first coupling section has: a first sealing portion configured to be continuous with a first sealing surface or a second sealing surface of the first pipe; and a first non-sealing portion configured to be continuous with a first non-sealing surface or a second non-sealing surface of the first pipe. The second coupling section has: a second sealing portion configured to be continuous with a first sealing surface or a second sealing surface of the second pipe; and a second non-sealing portion configured to be continuous with a first non-sealing surface or a second non-sealing surface of the second pipe.

8 Claims, 17 Drawing Sheets

(56)     References Cited

U.S. PATENT DOCUMENTS

| | | | |
|---|---|---|---|
| 11,046,176 B2 * | 6/2021 | Danielson | B60K 17/22 |
| 11,267,387 B2 * | 3/2022 | Kushimoto | B60R 19/03 |
| 2007/0210617 A1 | 9/2007 | Nakamura | |
| 2009/0239706 A1 | 9/2009 | Ishida et al. | |
| 2010/0201156 A1 | 8/2010 | Nakamura | |
| 2018/0312025 A1 | 11/2018 | Danielson et al. | |
| 2023/0037811 A1 * | 2/2023 | Warshaw | E04F 11/1808 |
| 2025/0026410 A1 * | 1/2025 | Hisamura | B62D 21/183 |

* cited by examiner

JOINT AND WORK VEHICLE

CROSS-REFERENCE TO RELATED APPLICATION

This application claims priority to Japanese Patent Application No. 2021-153446 filed Sep. 21, 2021, the disclosure of which is hereby incorporated by reference in its entirety.

BACKGROUND OF THE INVENTION

1. Field of the Invention

The present invention relates to a joint configured to couple respective ends of a pair of pipes to each other in such a manner that the ends face each other, the pair of pipes being included in a plurality of connected pipes of a roll-over protective structure (ROPS) frame of a work vehicle. The present invention also relates to a work vehicle equipped with a ROPS frame including the joint.

2. Description of the Related Art

JP 2009-67242 A discloses a joint and a work vehicle, the joint being configured to couple respective ends of a pair of pipes to each other in such a manner that the ends face each other, the pair of pipes being included in a plurality of connected pipes of a ROPS frame (see FIGS. 4 to 7 of JP 2009-67242 A).

The joint disclosed in JP 2009-67242 A includes (i) a first coupling section configured to be welded or otherwise coupled to the end of a first pipe, (ii) a second coupling section configured to be welded or otherwise coupled to the end of a second pipe, and (iii) a bolt extending, with the first and second coupling sections placed on each other, from the first coupling section to the second coupling section. This allows the pair of pipes to be coupled to each other with use of the joint.

The work vehicle disclosed in JP 2009-67242 A does not include on its ROPS frame a windshield or doors to be opened for a person to get in or out of the work vehicle. The ROPS frame thus includes round pipes.

JP 2007-245749 A, in contrast, discloses a ROPS frame provided with a windshield and doors to be opened for a person to get in or out of the work vehicle (see FIGS. 8 to 13 of JP 2007-245749 A). The ROPS frame includes pipes having sealing surfaces for contact with sealers of the windshield and doors. The pipes, with the sealing surfaces, have odd cross-sectional shapes.

SUMMARY OF THE INVENTION

The present invention has an object of providing a joint for a ROPS frame of a work vehicle and a work vehicle, the joint being capable of appropriately coupling pipes having sealing surfaces and odd cross-sectional shapes.

The present invention is a joint for a first pipe and a second pipe of a roll-over protective structure (ROPS) frame, the first and second pipes each having on an outer side: a first sealing surface and a second sealing surface each for contact with a sealer and opposite to each other in a cross-sectional view; and a first non-sealing surface and a second non-sealing surface opposite to each other in a cross-sectional view and each disposed between the corresponding first and second sealing surfaces, the joint being configured to couple an end of the first pipe and an end of the second pipe to each other in such a manner that the respective ends of the first and second pipes face each other and that the first and second sealing surfaces of the first pipe are continuous respectively with the first and second sealing surfaces of the second pipe, the joint including: a first coupling section configured to be coupled to the end of the first pipe; and a second coupling section configured to be coupled to the end of the second pipe, the first coupling section having: a first sealing portion configured to be continuous with the first sealing surface or the second sealing surface of the first pipe; and a first non-sealing portion configured to be continuous with the first non-sealing surface or the second non-sealing surface of the first pipe, the second coupling section having: a second sealing portion configured to be continuous with the first sealing surface or the second sealing surface of the second pipe; and a second non-sealing portion configured to be continuous with the first non-sealing surface or the second non-sealing surface of the second pipe, the first and second coupling sections being configured to be coupled to each other with use of a bolt extending, with the first and second coupling sections placed on each other, from the first non-sealing portion to the second non-sealing portion in a cross-sectional view.

The present invention is for a first pipe and second pipe of a ROPS frame for a work vehicle. The first and second pipes each have on the outer side (i) a first sealing surface and a second sealing surface each for contact with a sealer of the windshield or of a door and (ii) a first non-sealing surface and a second non-sealing surface. The first and second sealing surfaces are opposite to each other in a cross-sectional view. The first and second non-sealing surfaces are opposite to each other in a cross-sectional view and each disposed between the first and second sealing surfaces.

The present invention is a joint configured to couple an end of the first pipe and an end of the second pipe to each other in such a manner that the respective ends of the first and second pipes face each other and that the first and second sealing surfaces of the first pipe are continuous respectively with the first and second sealing surfaces of the second pipe.

The present invention is configured as follows: Coupling the first coupling section to the end of the first pipe results in a first sealing portion of the first coupling section being continuous with the first sealing surface or the second sealing surface of the first pipe and a first non-sealing portion of the first coupling section being continuous with the first non-sealing surface or the second non-sealing surface of the first pipe.

Further, coupling the second coupling section to the end of the second pipe results in a second sealing portion of the second coupling section being continuous with the first sealing surface or the second sealing surface of the second pipe and a second non-sealing portion of the second coupling section being continuous with the first non-sealing surface or the second non-sealing surface of the second pipe.

Placing the first and second coupling sections on each other in the above state results in, for instance, the following state: The respective first sealing surfaces of the first and second pipes are continuous with each other with use of the first sealing portion of the first coupling section.

The respective second sealing surfaces of the first and second pipes are continuous with each other with use of the second sealing portion of the second coupling section.

The respective first non-sealing surfaces of the first and second pipes are continuous with each other with use of the first non-sealing portion of the first coupling section.

The respective second non-sealing surfaces of the first and second pipes are continuous with each other with use of the second non-sealing portion of the second coupling section.

The joint of the present invention allows the first and second sealing surfaces of the first pipe to be connected respectively with the first and second sealing surfaces of the second pipe with use of the first and second sealing portions of the first and second coupling sections. The joint also allows the first and second non-sealing surfaces of the first pipe to be connected respectively with the first and second non-sealing surfaces of the second pipe with use of the first and second non-sealing portions of the first and second coupling sections. This allows the first and second pipes to be coupled to each other with use of the joint with appropriate strength.

The joint of the present invention (specifically, the first and second coupling sections) serves as part of each of a pair of combined sealing surfaces so that the sealing surfaces are not discontinuous at the joint. This ensures appropriate sealability for the case of the ROPS frame being provided with a windshield and doors to be opened for a person to get in or out of the work vehicle.

The joint of the present invention is configured such that with the first and second coupling sections placed on each other and coupled to each other with use of a bolt, the bolt extends from the first non-sealing portion of the first coupling section to the second non-sealing portion of the second coupling section in a cross-sectional view.

The bolt is thus not at the first sealing portion of the first coupling section or at the second sealing portion of the second coupling section. This configuration prevents the bolt from impairing the sealability, and advantageously ensures the sealability.

The present invention may preferably be arranged such that the first coupling section has a first contact surface configured to, with the first and second coupling sections placed on each other, be in contact with the second coupling section, the second coupling section has a second contact surface configured to, with the first and second coupling sections placed on each other, be in contact with the first coupling section, and the bolt extends from the first non-sealing portion to the second non-sealing portion in such a manner as to obliquely cross the first and second contact surfaces in a cross-sectional view.

If, with the first and second coupling sections placed on each other, the bolt were attached thereto orthogonally to the first and second contact surfaces of the first and second coupling sections, the bolt would receive shear stress resulting from all load applied along the first and second contact surfaces.

The above embodiment of the present invention is configured such that with the first and second coupling sections placed on each other, the bolt is attached thereto in such a manner as to obliquely cross the first and second contact surfaces. The bolt will thus receive not only shear stress but also compressive (or tensile) stress as a result of a load applied along the first and second contact surfaces.

The above configuration causes the load to be divided into shear stress and compressive (or tensile) stress for the bolt, thereby advantageously ensuring the strength of the bolt.

The present invention may preferably be arranged such that the first coupling section has a first contact surface configured to, with the first and second coupling sections placed on each other, be in contact with the second coupling section, the second coupling section has a second contact surface configured to, with the first and second coupling sections placed on each other, be in contact with the first coupling section, the second contact surface has a protrusion facing the first contact surface in a cross-sectional view, the first contact surface has a depression configured to receive the protrusion in a cross-sectional view, and with the first and second coupling sections placed on each other, the protrusion is in the depression.

The above embodiment of the present invention is configured such that with the first and second coupling sections placed on each other, not only the bolt but also the protrusion and the depression engaged with each other will receive a load applied along the first and second contact surfaces.

The above configuration causes the load to be divided into a portion on the bolt and a portion on the protrusion and the depression engaged with each other, thereby advantageously ensuring the strength of the bolt.

The present invention may preferably be arranged such that the depression is a portion of the first contact surface which portion is depressed toward the first non-sealing portion in a cross-sectional view.

The joint is configured such that the first and second sealing portions of the first and second coupling sections are curved inward in a cross-sectional view. The first non-sealing portion of the first coupling section is thicker than the first sealing portion thereof in a cross-sectional view.

The above embodiment of the present invention is configured such that the depression is a portion of the first contact surface which portion is depressed toward the first non-sealing portion in a cross-sectional view. Since the first non-sealing portion is thick, the depression can be large.

Further, the second coupling section may have a large protrusion regardless of the thickness of the second sealing portion or that of the second non-sealing portion.

The above configuration thus allows a large protrusion and a large depression to be engaged with each other. With the first and second coupling sections placed on each other, the protrusion and the depression engaged with each other support a large portion of a load applied along the first and second contact surfaces and reduce the load on the bolt. This advantageously ensures the strength of the bolt.

The present invention may preferably be arranged such that the bolt extends from the first non-sealing portion to the second non-sealing portion through the protrusion and the depression in a cross-sectional view.

The above embodiment of the present invention is configured such that with the first and second coupling sections placed on each other, not only the bolt also the protrusion and the depression engaged with each other will receive a load applied along the first and second contact surfaces in a divided manner efficiently at respective positions substantially identical to each other. This advantageously ensures the strength of the bolt.

A work vehicle according to the present invention includes: the ROPS frame including the joint.

The present invention provides a work vehicle with appropriate sealability ensured for the case of the ROPS frame being provided with a windshield and doors to be opened for a person to get in or out of the work vehicle as mentioned above.

DETAILED DESCRIPTION OF PREFERRED EMBODIMENTS

FIGS. 1 to 21 illustrate a multipurpose work vehicle provided with a roll-over protective structure (ROPS) frame 7 with joints 20 and 30. FIGS. 1 to 21 show "F" to indicate the forward direction, "B" to indicate the backward direction, "U" to indicate the upward direction, "D" to indicate the downward direction, "L" to indicate the leftward direction, and "R" to indicate the rightward direction.

Overall Configuration of Work Vehicle

Figure 1:
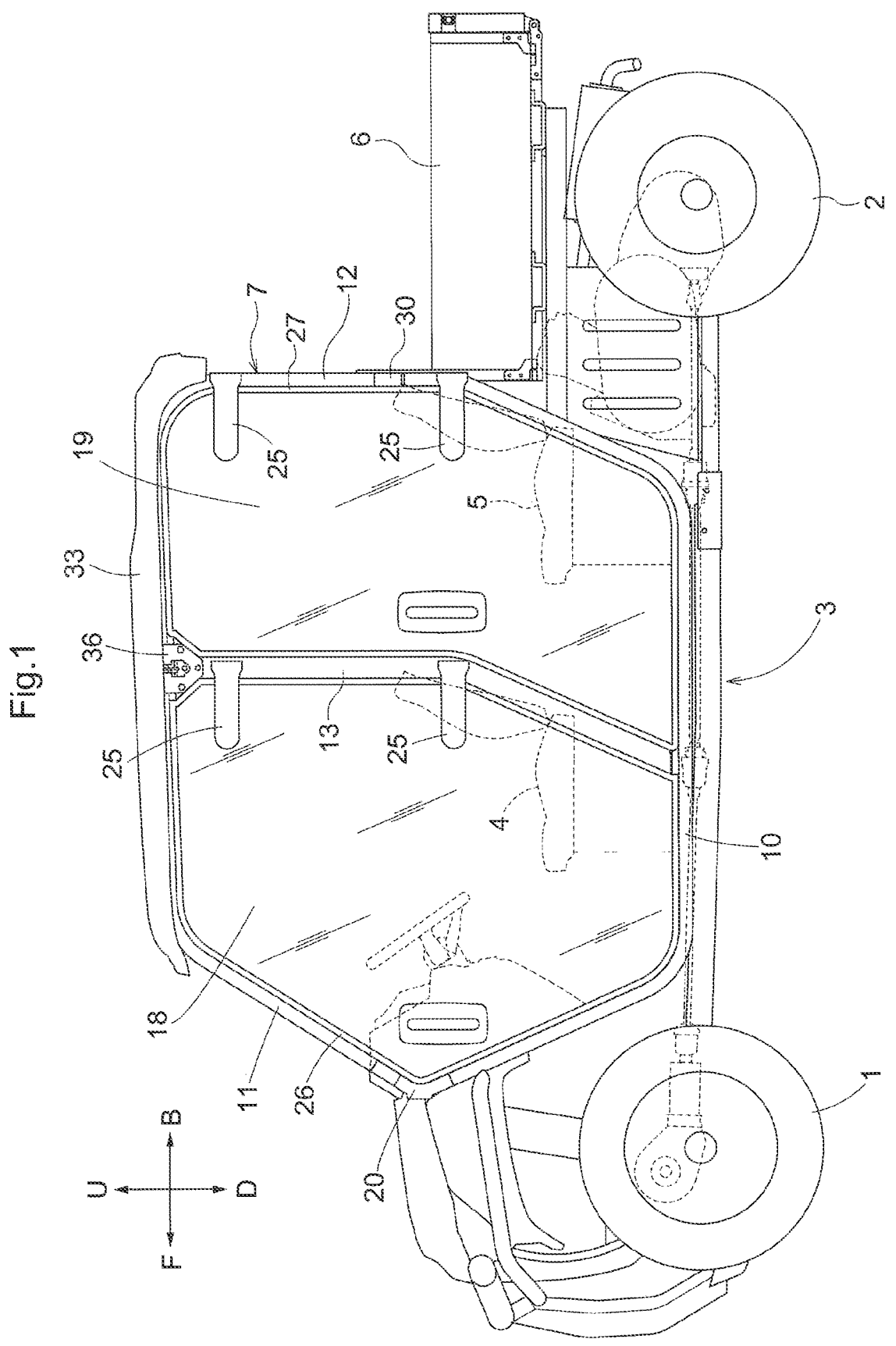
FIG. 1 is a left side view of a work vehicle.

As illustrated in FIG. 1, the work vehicle includes a pair of left and right front wheels 1, a pair of left and right rear wheels 2, and a body 3 supported by the front wheels 1 and the rear wheels 2. The body 3 is provided with a pair of left and right front seats 4, a pair of left and right back seats 5, and a carrier box 6 backward of the back seats 5.

The work vehicle includes a ROPS frame 7 enclosing the front seats 4 and the back seats 5. The work vehicle includes a windshield 8 (see FIG. 7) at a front portion of the ROPS frame 7, a rear glass window 9 (see FIG. 10) at a back portion of the ROPS frame 7, and a roof 33 at an upper portion of the ROPS frame 7. The work vehicle includes a pair of left and right front doors 18 respectively at left front and right front portions of the ROPS frame 7 and a pair of left and right rear doors 19 respectively at left back and right back portions of the ROPS frame 7.

Overall Configuration of ROPS Frame

As illustrated in FIGS. 1 to 4, the ROPS frame 7 includes a pair of left and right pipes 10 each in the shape of a channel in a side view, a pair of left and right pipes 11 each angled in a side view, a pair of left and right pipes 12 each angled in a side view, a pair of left and right frame members 13, and a frame member 14.

The ROPS frame 7 includes (i) a pair of left and right front joints 20 each coupling the front upper end of the corresponding pipe 10 to the front lower end of the corresponding pipe 11, (ii) a frame member 15 extending between and coupled to the front joints 20, and (iii) a plate-shaped frame member 17 extending between and coupled to the pipes 11.

The ROPS frame 7 includes a pair of left and right rear joints 30 each coupling the back upper end of the corresponding pipe 10 to the back lower end of the corresponding pipe 12. The pipes 11 each have a back upper end coupled to the front upper end of the corresponding pipe 12. The ROPS frame 7 includes (i) a frame member 16 and a plate-shaped frame member 23 each extending between and coupled to the pipes 12 and (ii) a pair of left and right handles 24 coupled to the respective pipes 12 and designed for use by a person to get in and out of the work vehicle.

The frame members 13 each extend in the up-down direction to be coupled to (i) an intermediate portion of the corresponding pipe 10 in the front-back direction and (ii) that portion at which the back upper end of the corresponding pipe 11 is coupled to the front upper end of the corresponding pipe 12. The ROPS frame 7 includes a pair of left and right handles 24 coupled to the respective pipes 13 and designed for use by a person to get in and out of the work vehicle.

The frame member 14 extends in the left-right direction to be coupled to (i) that portion at which the back upper end of the right pipe 11 is coupled to the front upper end of the right pipe 12 and (ii) that portion at which the back upper end of the left pipe 11 is coupled to the front upper end of the left pipe 12.

The windshield 8 (see FIG. 7) is attached to and surrounded by the pipes 11 and the frame members 15 and 17. The rear glass window 9 (see FIG. 10) is attached to the frame member 23 in such a manner as to be capable of being opened and closed in the front-back direction.

The front doors 18 are each attached to the corresponding frame member 13 with use of hinges 25 in such a manner as to be capable of being opened and closed. The rear doors 19 are each attached to the corresponding pipes 10 and 12 with use of hinges 25 in such a manner as to be capable of being opened and closed.

The ROPS frame 7, as described above, includes pipes 10, 11, and 12 and frame members 13 to 17 and 23. The pipes 10 are coupled to the body 3.

Cross-Sectional Shapes of Pipes

As illustrated in FIGS. 2, 3, 14, and 15, each pipe 11 has a pair of sealing surfaces 11a and 11b each angled in cross section and opposite to each other in a cross-sectional view.

Each pipe 11 also has a pair of non-sealing surfaces 11c and 11d opposite to each other in a cross-sectional view and each disposed between the sealing surfaces 11a and 11b. The sealing surfaces 11*a* and 11*b* and the non-sealing surfaces 11*c* and 11*d* extend along the entire length of the pipe 11.

As illustrated in FIGS. 2 and 7 to 9, each pipe 10 has a pair of sealing surfaces 10*a* and 10*b* and a pair of non-sealing surfaces 10*c* and 10*d* similarly to the pipes 11. The sealing surfaces 10*a* and 10*b* and the non-sealing surfaces 10*c* and 10*d* extend along the entire length of the pipe 10. The pipes 10 each have a cross-sectional shape identical to that of each pipe 11 (see FIGS. 14 and 15).

As illustrated in FIGS. 2, 3, 14, and 15, each pipe 12 has a pair of sealing surfaces 12*a* and 12*b* and a pair of non-sealing surfaces 12*c* and 12*d* similarly to the pipes 11. The sealing surfaces 12*a* and 12*b* and the non-sealing surfaces 12*c* and 12*d* extend along the entire length of the pipe 12. The pipes 12 each have a cross-sectional shape identical to that of each pipe 11 (see FIGS. 14 and 15).

Figure 2:
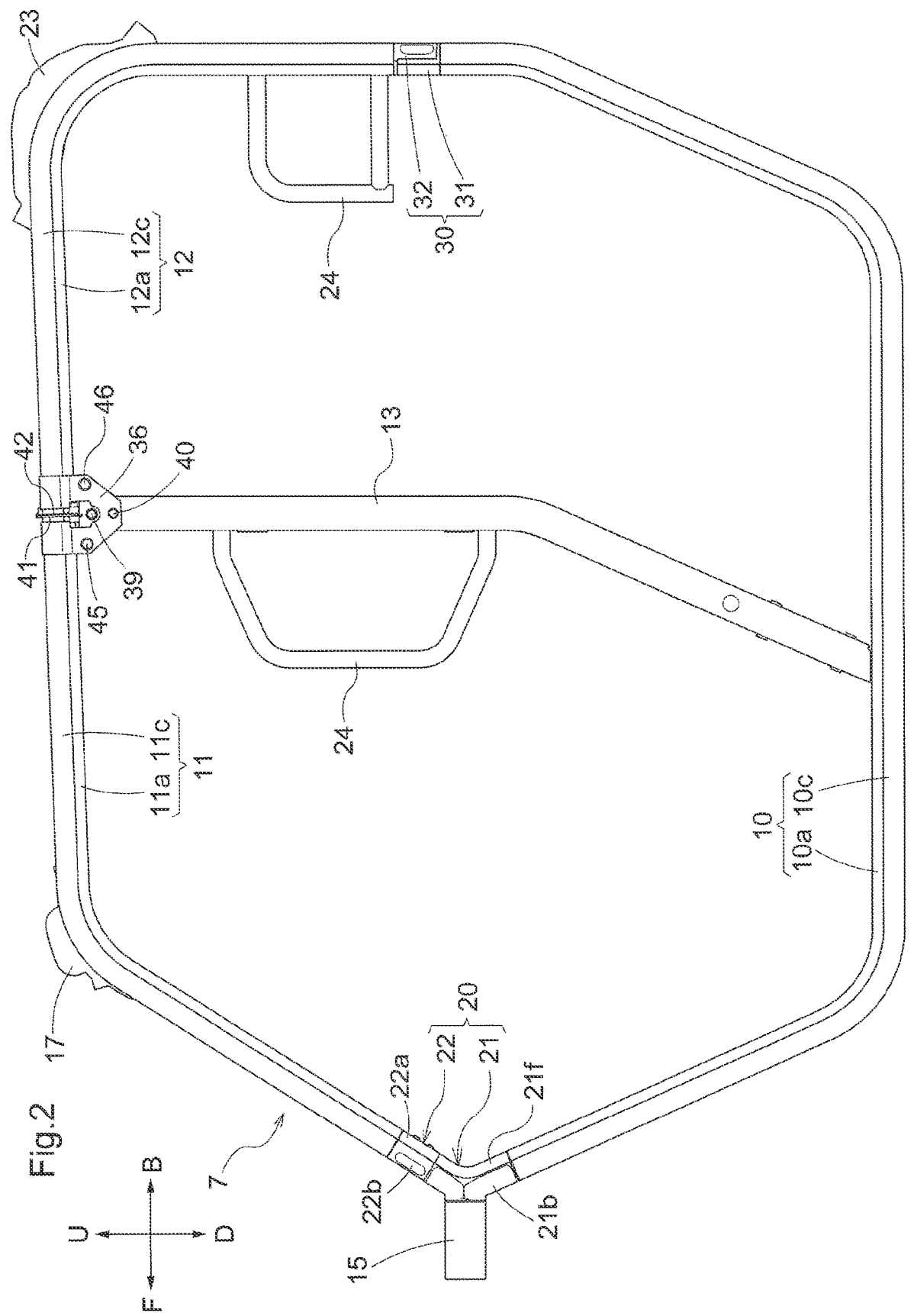
FIG. 2 is a left side view of a ROPS frame.
Figure 3:
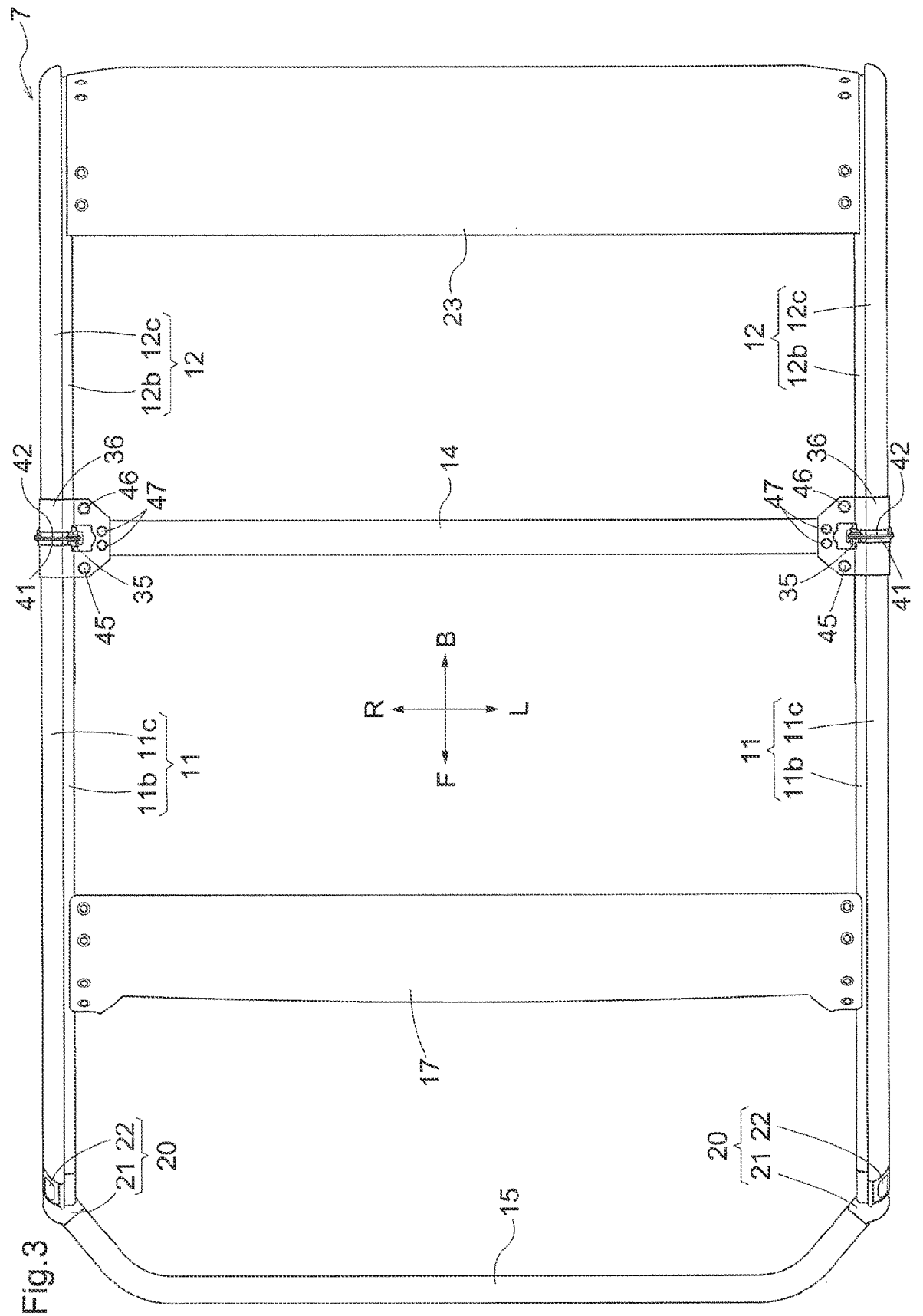
FIG. 3 is a plan view of a ROPS frame.
Figure 4:
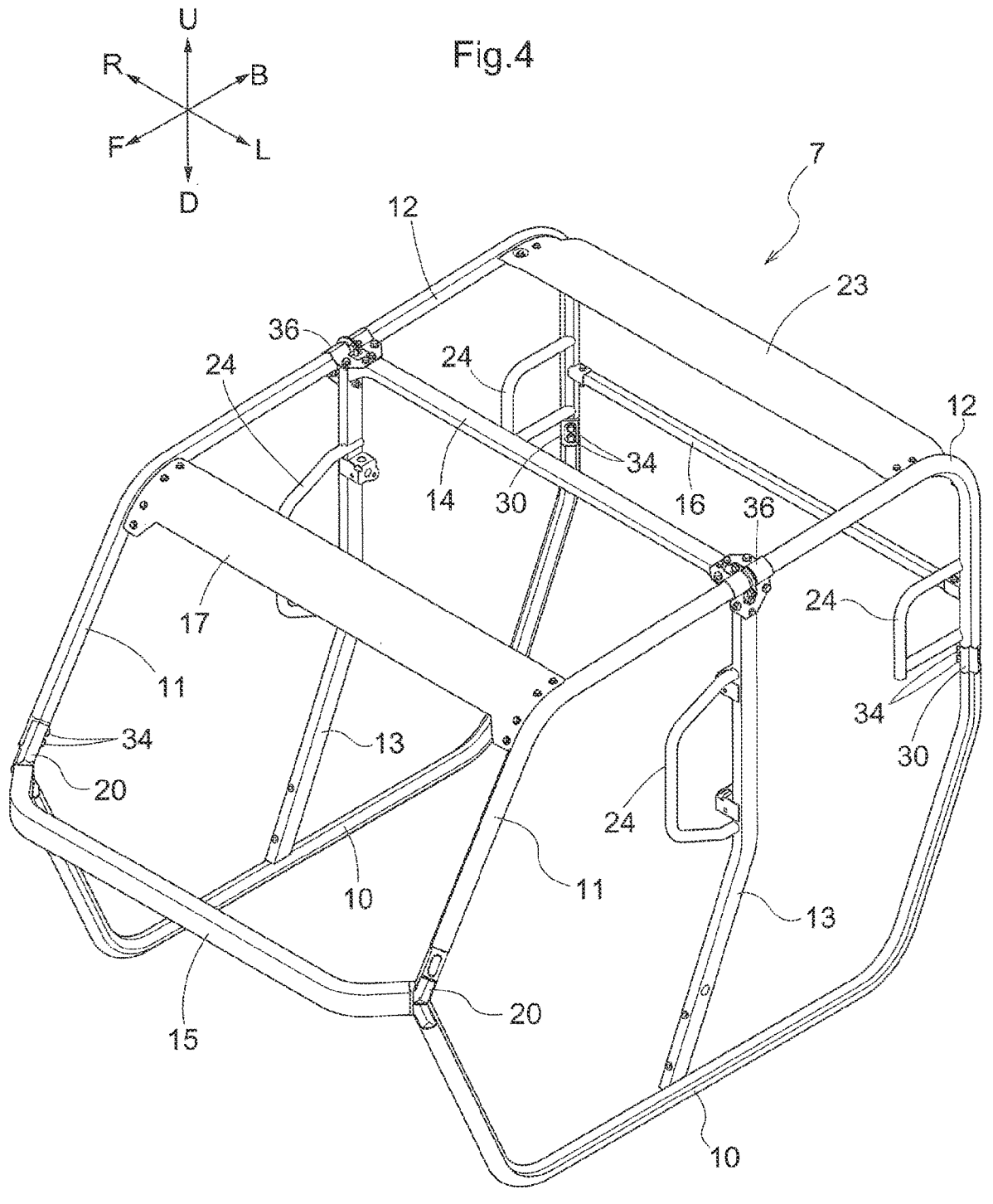
FIG. 4 is a perspective view of a ROPS frame.

As illustrated in FIGS. 2, 3, and 4, the frame members 13, 15, and 16 each have a rectangular cross section, while the frame member 14 has a channel-shaped cross section.

How Pipes are Related to Windshield, Front Doors, and Rear Doors

Figure 5:
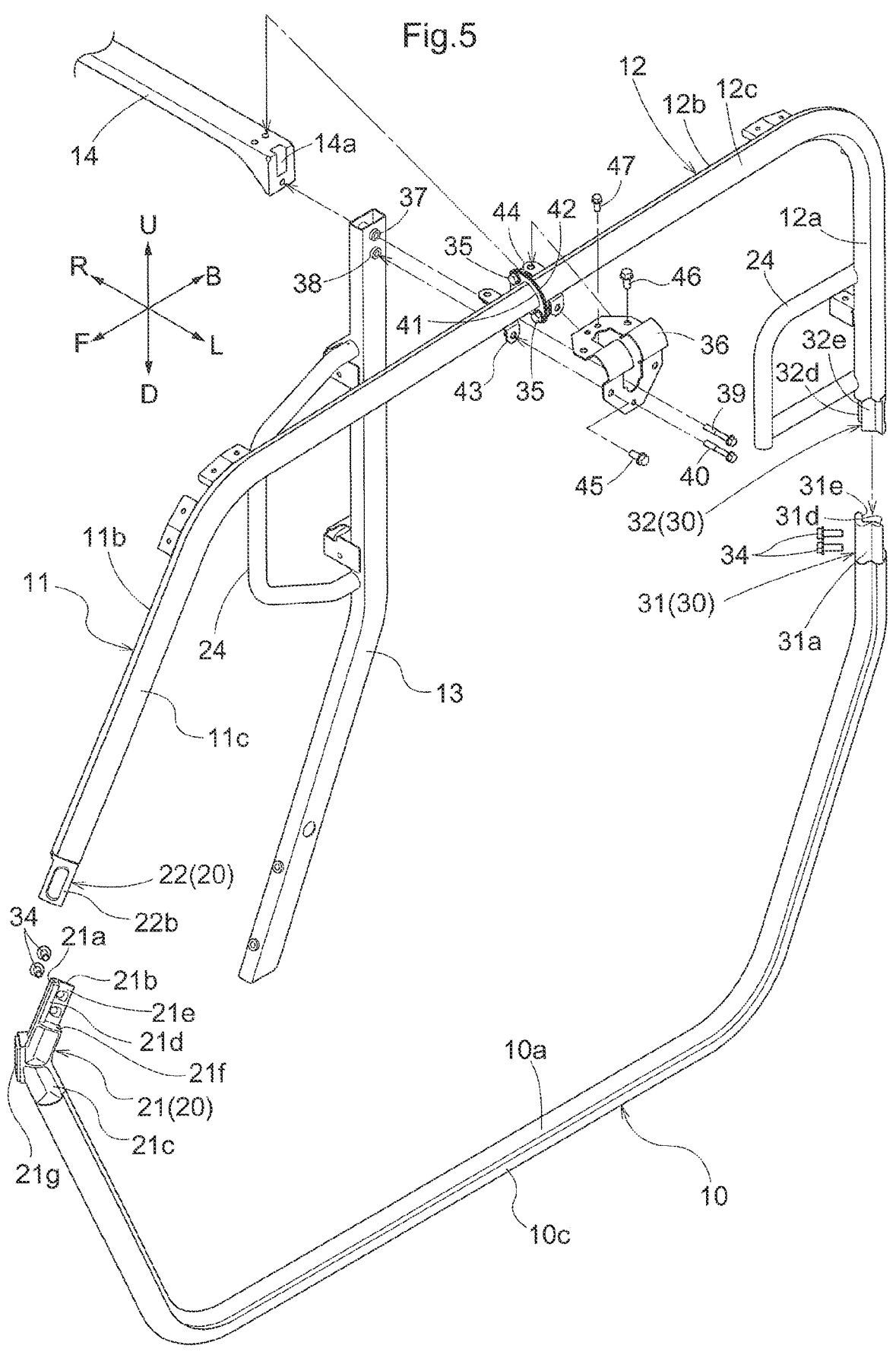
FIG. 5 is an exploded perspective view of a left-side portion of a ROPS frame.
Figure 6:
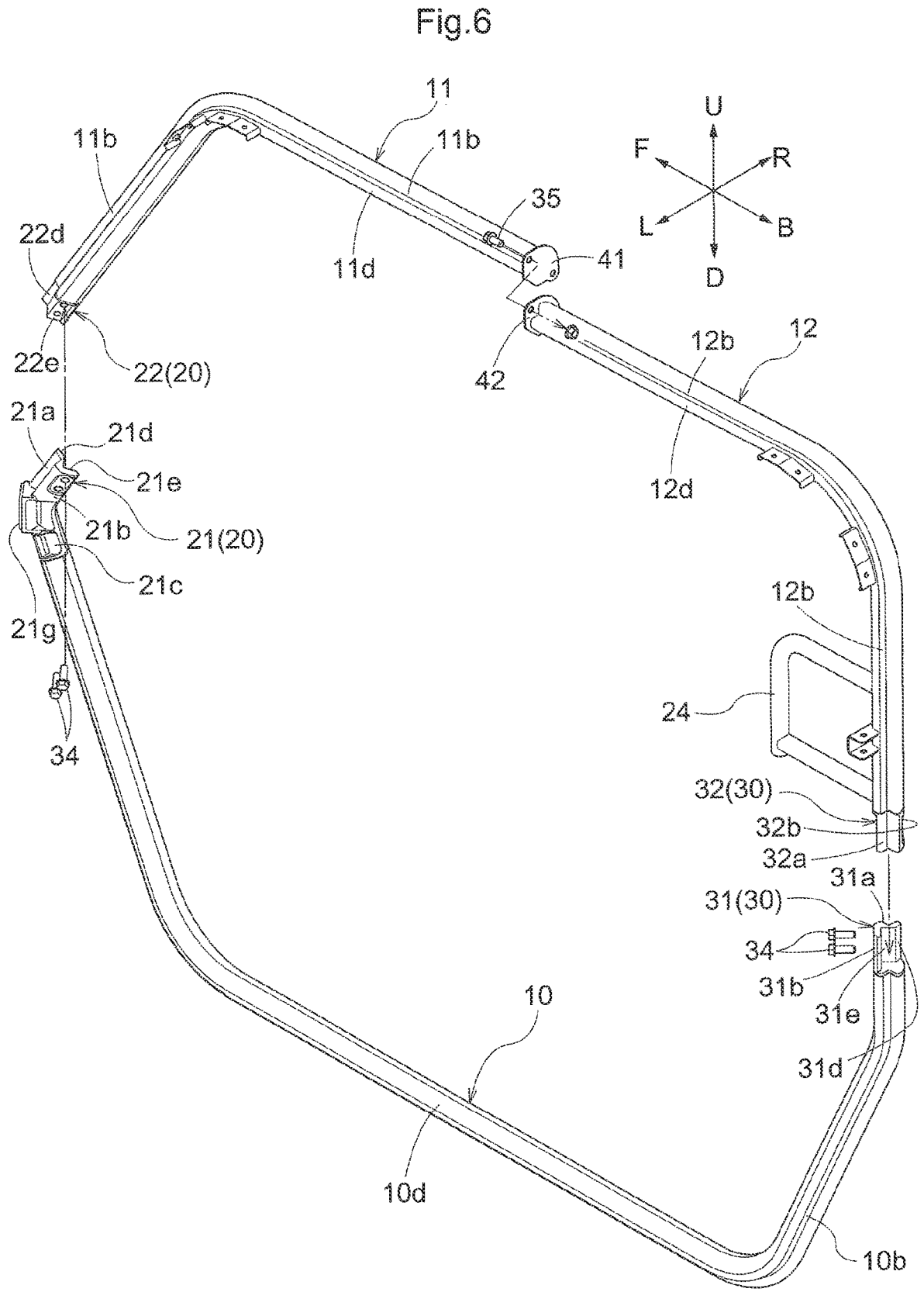
FIG. 6 is an exploded perspective view of a right-side portion of a ROPS frame.

As illustrated in FIGS. 2, 5, and 6, the ROPS frame 7 is configured such that the respective sealing surfaces 10*a*, 11*a*, and 12*a* of the pipes 10, 11, and 12 on each side are continuous with one another and face outward.

Figure 7:
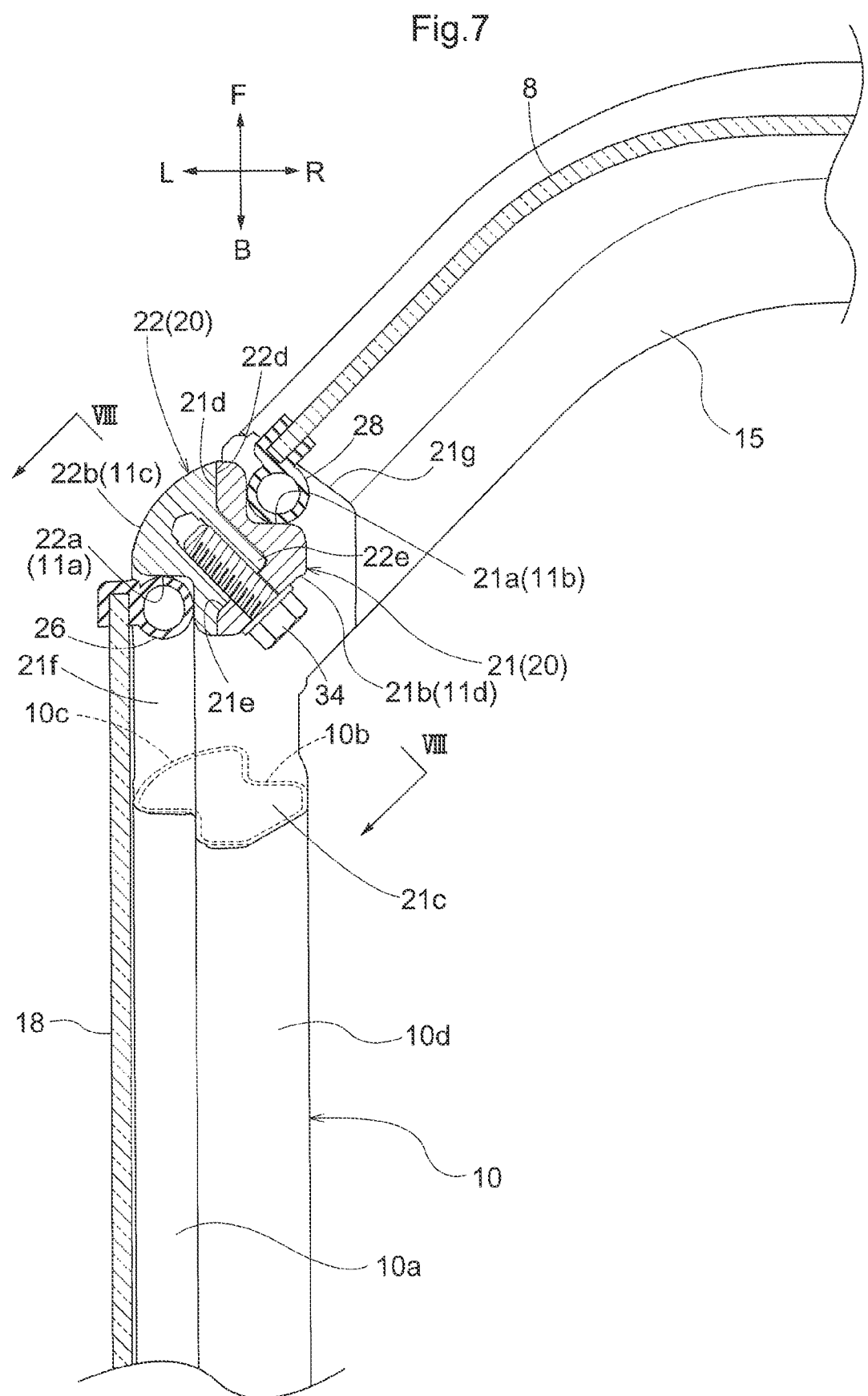
FIG. 7 is a plan cross-sectional view of a left-side front joint and its nearby portion of a ROPS frame.

As illustrated in FIGS. 1 and 7, each front door 18 has an outer edge provided with a rubber sealer 26 attached thereto. Closing the front door 18 brings the sealer 26 into contact with the respective sealing surfaces 10*a* and 11*a* of the corresponding pipes 10 and 11 and the corresponding frame member 13 (see FIG. 4).

Figure 10:
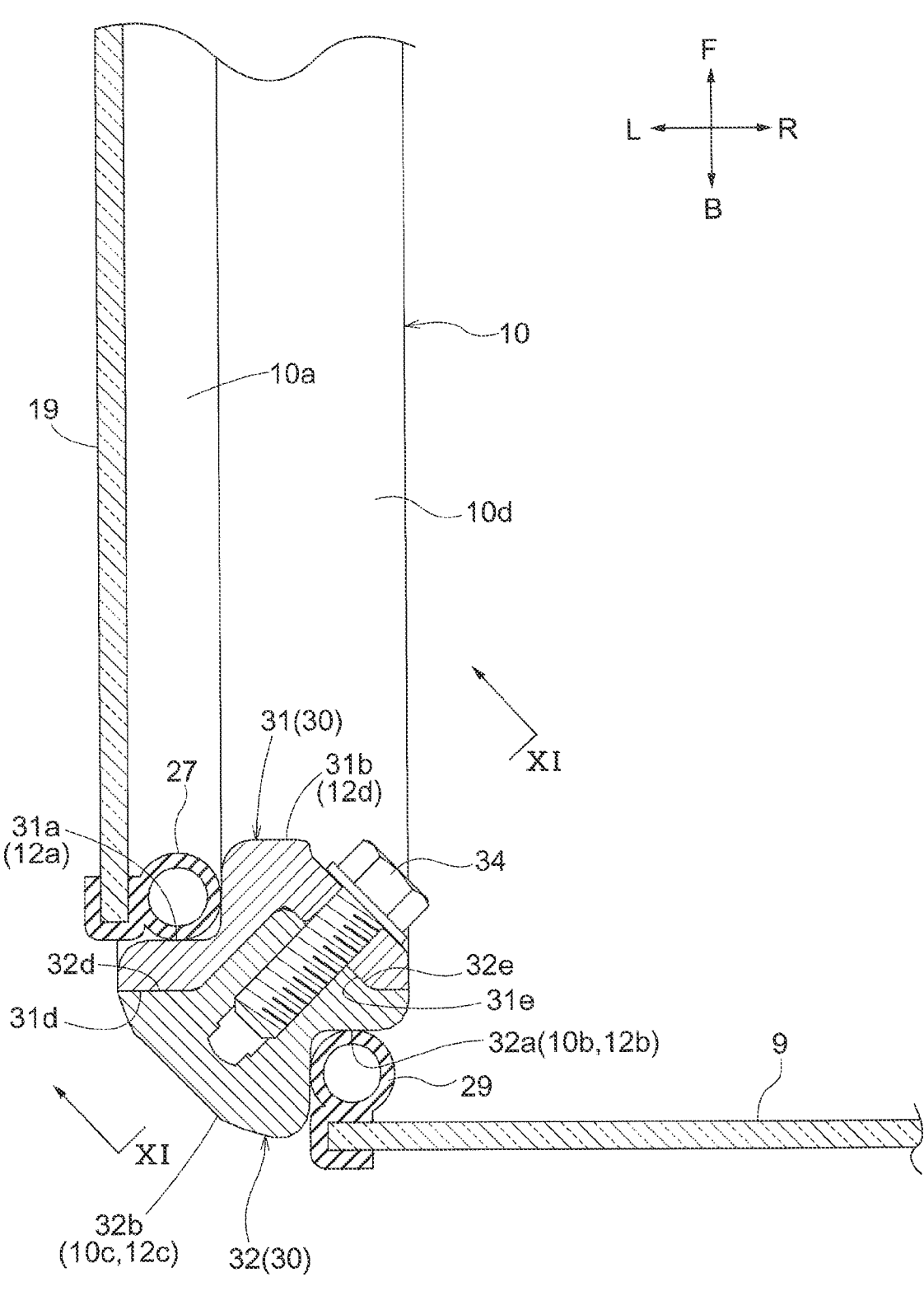
FIG. 10 is a plan cross-sectional view of a left-side rear joint and its nearby portion of a ROPS frame.

As illustrated in FIGS. 1 and 10, each rear door 19 has an outer edge provided with a rubber sealer 27 attached thereto. Closing the rear door 19 brings the sealer 27 into contact with the respective sealing surfaces 10*a* and 12*a* of the corresponding pipes 10 and 12 and the corresponding frame member 13 (see FIG. 4).

As illustrated in FIGS. 5 and 7, the windshield 8 has an outer edge provided with a rubber sealer 28 attached thereto. The windshield 8 is attached to and surrounded by the pipes 11 and the frame members 15 and 17 in such a manner that the sealer 28 is in contact with the respective sealing surfaces 11*b* of the pipes 11 and the frame members 15 and 17 (see FIG. 4).

As illustrated in FIGS. 6 and 10, the rear glass window 9 has an outer edge provided with a rubber sealer 29 attached thereto. Closing the rear glass window 9 brings the sealer 29 into contact with the respective sealing surfaces 10*b* and 12*b* of the pipes 10 and 12 on each side and the frame member 23 (see FIG. 4).

The roof 33 (see FIG. 1) has an outer edge provided with a rubber sealer (not shown in the drawings) attached thereto. As illustrated in FIGS. 5 and 6, the roof 33 is attached to and disposed between the pipes 11 and 12 in such a manner that the sealer is in contact with the respective sealing surfaces 11*b* of the pipes 11 and the respective sealing surfaces 12*b* of the pipes 12.

Configuration of Front Joints

As illustrated in FIGS. 1 to 4, each front joint 20, which couples the front upper end of the corresponding pipe 10 to the front lower end of the corresponding pipe 11, includes a first coupling section 21 and a second coupling section 22.

As illustrated in FIGS. 5 to 9, the first coupling section 21 includes a first sealing portion 21*a* and a first non-sealing portion 21*b*. The first coupling section 21 also has, between the first sealing portion 21*a* and the first non-sealing portion 21*b*, a first contact surface 21*d* with a depression 21*e*. The first coupling section 21 includes a coupling portion 21*c* with a bent shape in a side view. The coupling portion 21*c* includes a third sealing portion 21*f*, a third non-sealing portion 21*h*, and an attachment portion 21*g*.

The second coupling section 22 includes a second sealing portion 22*a*, a second non-sealing portion 22*b*, and a coupling portion 22*c*. The second coupling section 22 has, between the second sealing portion 22*a* and the second non-sealing portion 22*b*, a second contact surface 22*d* with a protrusion 22*e*.

As illustrated in FIG. 7, placing the first coupling section 21 and the second coupling section 22 on each other brings the first contact surface 21*d* into contact with the second coupling section 22 and the second contact surface 22*d* into contact with the first coupling section 21. The protrusion 22*e*, which is at the second contact surface 22*d*, is triangular in cross section and protrudes toward the first contact surface 21*d* in a cross-sectional view.

The depression 21*e*, which is at the first contact surface 21*d*, is triangular in cross section and receives the protrusion 22*e* in a cross-sectional view. The depression 21*e* is a portion of the first contact surface 21*d* which portion is depressed toward the first non-sealing portion 21*b* in a cross-sectional view.

Coupling of Front Joints

As illustrated in FIGS. 5 to 9, the coupling portion 21*c* is coupled to the front upper end of the corresponding pipe 10 as a first pipe; the attachment portion 21*g* is coupled to the frame member 15; and the coupling portion 22*c* is coupled to the front lower end of the corresponding pipe 11 as a second pipe.

With the first coupling section 21 coupled to the corresponding pipe 10, the first non-sealing portion 21*b* is continuous with the non-sealing surface 10*d* of the pair of non-sealing surfaces 10*c* and 10*d* of the pipe 10; the third sealing portion 21*f* of is continuous with the sealing surface 10*a* of the pair of sealing surfaces 10*a* and 10*b* of the pipe 10; and the third non-sealing portion 21*h* is continuous with the non-sealing surface 10*c* of the pair of non-sealing surfaces 10*c* and 10*d* of the pipe 10.

With the second coupling section 22 coupled to the corresponding pipe 11, the second sealing portion 22*a* is continuous with the sealing surface 11*a* of the pair of sealing surfaces 11*a* and 11*b* of the pipe 11; and the second non-sealing portion 22*b* is continuous with the non-sealing surface 11*c* of the pair of non-sealing surfaces 11*c* and 11*d* of the pipe 11.

Figure 8:
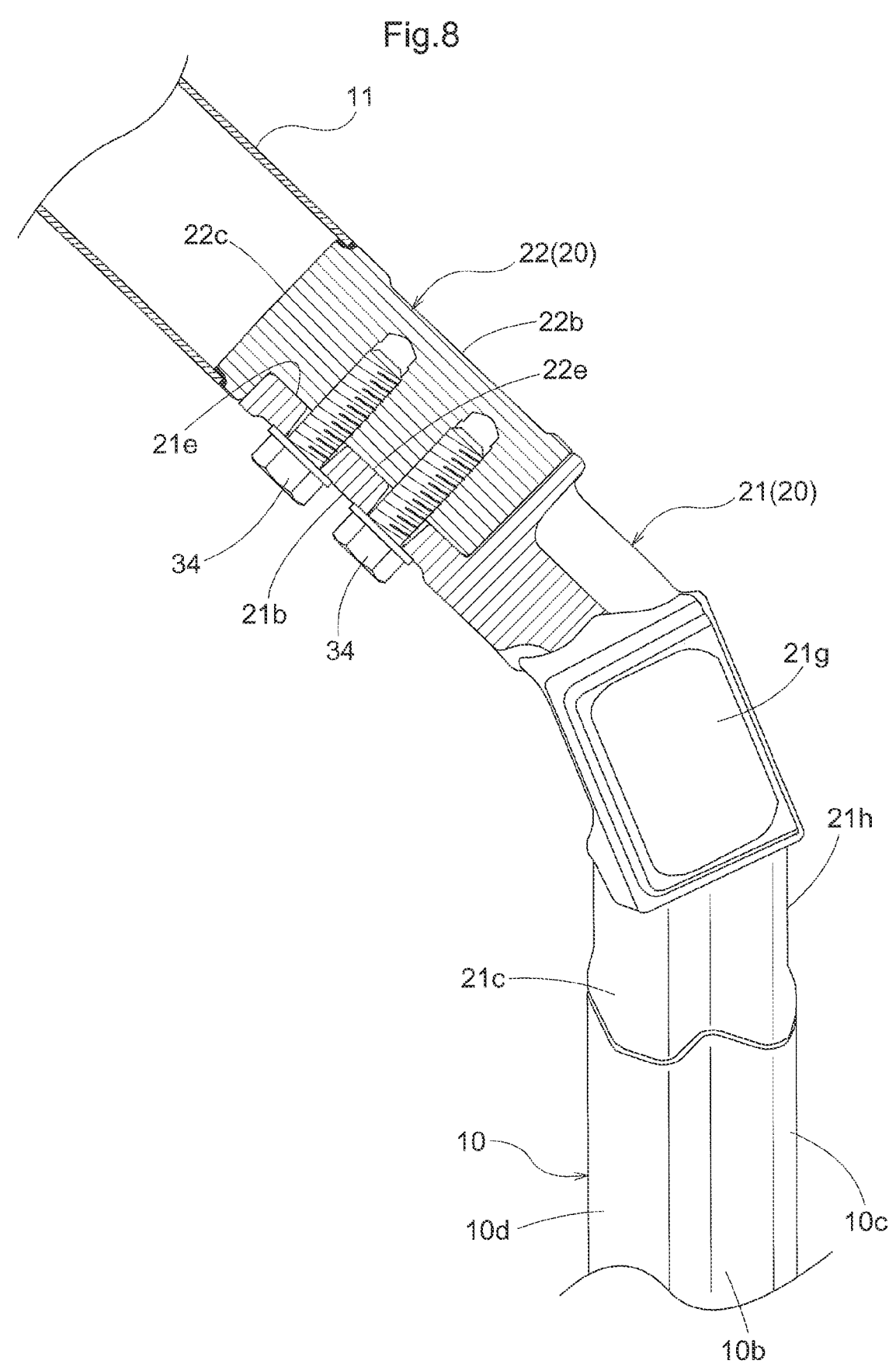
FIG. 8 is a cross-sectional view of the left-side front joint and its nearby portion in FIG. 7 taken along line VIII-VIII in FIG. 7.
Figure 9:
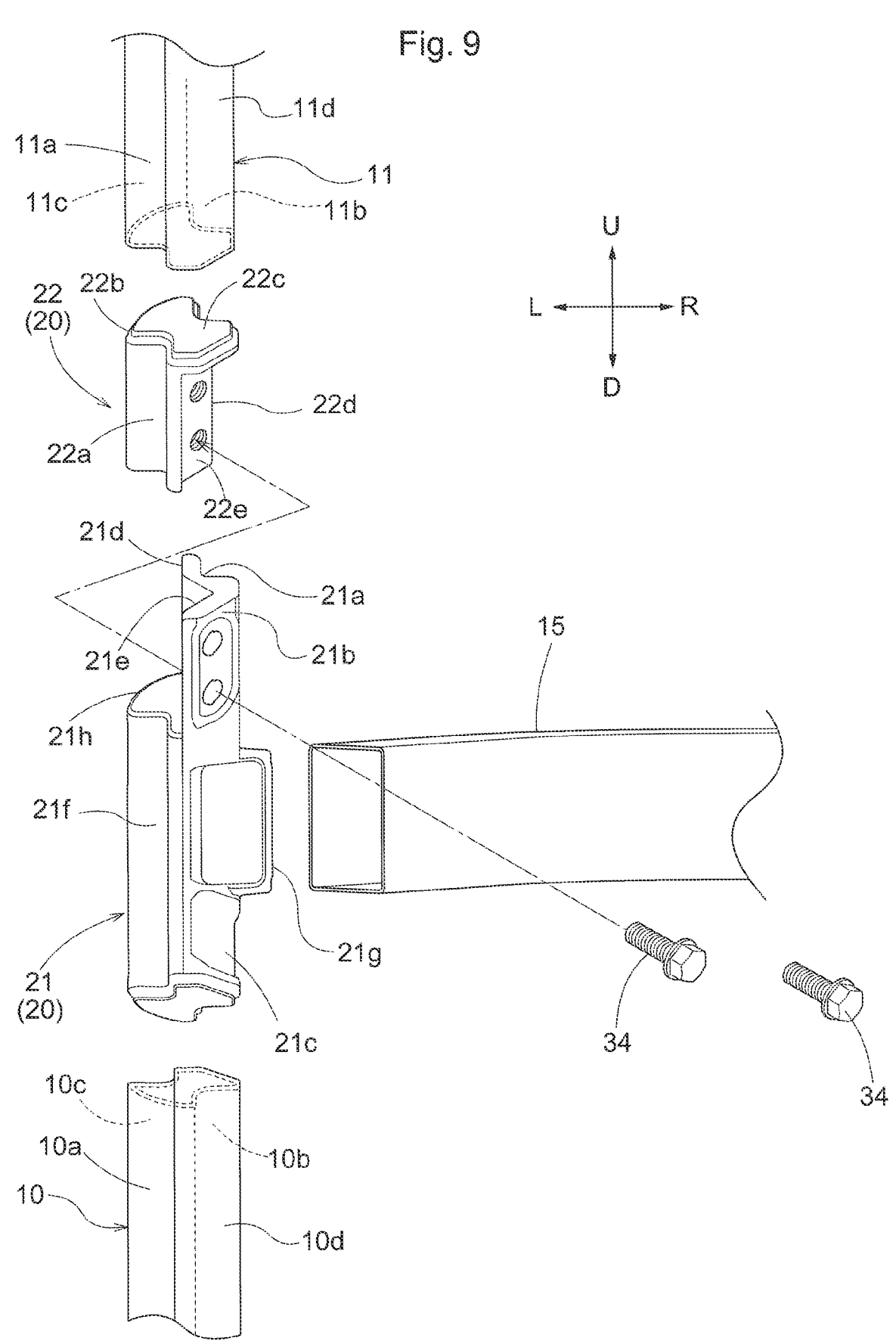
FIG. 9 is an exploded perspective view of a left-side front joint and its nearby portion of a ROPS frame.

With the first coupling section 21 of each joint 20 coupled to the corresponding pipe 10 and the second coupling section 22 thereof coupled to the corresponding pipe 11 as described under "Configuration of Front Joints" above, the first coupling section 21 (specifically, the first contact surface 21*d*) and the second coupling section 22 (specifically, the second contact surface 22*d*) are placed on each other as illustrated in FIGS. 7 and 8.

With the first coupling section 21 and the second coupling section 22 placed on each other, the protrusion 22*e* is in the depression 21*e*. The first coupling section 21 and the second coupling section 22 are coupled to each other with use of bolts 34.

In a cross-sectional view, the bolts 34 in the above state each extend through the protrusion 22*e* and the depression 21*e*, obliquely cross the first contact surface 21*d* and the second contact surface 22*d*, and are each in contact with the first non-sealing portion 21*b* and the second non-sealing portion 22*b*.

As described above, the joints 20 are each configured such that coupling the first coupling section 21 and the second coupling section 22 to each other results in the pipes 10 and 11 being coupled to each other with use of the joint 20 (namely, the first coupling section 21 and the second coupling section 22) in such a manner that the front upper end and the front lower end face each other.

Positional Relationships Between Front Joints and Pipes

As illustrated in FIGS. 5 to 7 and 9, with the first coupling section 21 and the second coupling section 22 of each joint 20 coupled to each other, the first coupling section 21, the second coupling section 22, and the corresponding pipes 10 and 11 are positionally related to one another as described below.

With the first coupling section 21 coupled to the second coupling section 22, the third sealing portion 21*f* is continuous with the second sealing portion 22*a*.

As described under "Coupling of Front Joints" above, the third sealing portion 21*f* is continuous with the sealing surface 10*a* of the pair of sealing surfaces 10*a* and 10*b* of the corresponding pipe 10; and the second sealing portion 22*a* is continuous with the sealing surface 11*a* of the pair of sealing surfaces 11*a* and 11*b* of the corresponding pipe 11.

This allows the sealing surface 10*a* of the pipe 10 to be continuous with the sealing surface 11*a* of the pipe 11 with use of the third sealing portion 21*f* and the second sealing portion 22*a*.

As described under "How Pipes Are Related to Windshield, Front Doors, and Rear Doors" above, closing each front door 18 brings the sealer 26 into contact with the respective sealing surfaces 10*a* and 11*a* of the corresponding pipes 10 and 11 and the outer surface of the corresponding frame member 13. In this state, the sealer 26 is also in contact with the third sealing portion 21*f* and the second sealing portion 22*a*.

Coupling the first coupling section 21 to the second coupling section 22 results in the first sealing portion 21*a* being continuous with the sealing surface 11*b* of the pair of sealing surfaces 11*a* and 11*b* of the corresponding pipe 11.

When the sealer 28 of the windshield 8 is in contact with the respective sealing surfaces 11*b* of the pipes 11 as described under "How Pipes Are Related to Windshield, Front Doors, and Rear Doors" above, the sealer 28 is also in contact with the first sealing portion 21*a*.

With the first coupling section 21 coupled to the second coupling section 22, the third non-sealing portion 21*h* is continuous with the second non-sealing portion 22*b*.

As described under "Coupling of Front Joints" above, the first non-sealing portion 21*b* is continuous with the non-sealing surface 10*d* of the pair of non-sealing surfaces 10*c* and 10*d* of the corresponding pipe 10; the third non-sealing portion 21*h* is continuous with the non-sealing surface 10*c* of the pair of non-sealing surfaces 10*c* and 10*d* of the pipe 10; and the second non-sealing portion 22*b* is continuous with the non-sealing surface 11*c* of the pair of non-sealing surfaces 11*c* and 11*d* of the pipe 11.

This allows the non-sealing surface 10*c* of the pipe 10 to be continuous with the non-sealing surface 11*c* of the pipe 11 with use of the third non-sealing portion 21*h* and the second non-sealing portion 22*b*, and also allows the non-sealing surface 10*d* of the pipe 10 to be continuous with the non-sealing surface 11*d* of the pipe 11 with use of the first non-sealing portion 21*b*.

Configuration of Rear Joints

As illustrated in FIGS. 1 to 4, each rear joint 30, which couples the back upper end of the corresponding pipe 10 to the back lower end of the corresponding pipe 12, includes a first coupling section 31 and a second coupling section 32.

As illustrated in FIGS. 5, 6, and 10 to 12, the first coupling section 31 includes a first sealing portion 31*a*, a first non-sealing portion 31*b*, and a coupling portion 31*c*. The first coupling section 31 also has, between the first sealing portion 31*a* and the first non-sealing portion 31*b*, a first contact surface 31*d* with a depression 31*e*.

The second coupling section 32 includes a second sealing portion 32*a*, a second non-sealing portion 32*b*, and a coupling portion 32*c*. The second coupling section 32 has, between the second sealing portion 32*a* and the second non-sealing portion 32*b*, a second contact surface 32*d* with a protrusion 32*e*.

As illustrated in FIG. 10, placing the first coupling section 31 and the second coupling section 32 on each other brings the first contact surface 31*d* into contact with the second coupling section 32 and the second contact surface 32*d* into contact with the first coupling section 31. The protrusion 32*e*, which is at the second contact surface 32*d*, is triangular in cross section and protrudes toward the first contact surface 31*d* in a cross-sectional view.

The depression 31*e*, which is at the first contact surface 31*d*, is triangular in cross section and receives the protrusion 32*e* in a cross-sectional view. The depression 31*e* is a portion of the first contact surface 31*d* which portion is depressed toward the first non-sealing portion 31*b* in a cross-sectional view.

Coupling of Rear Joints

As illustrated in FIGS. 5, 6, and 10 to 12, the coupling portion 31*c* is coupled to the back upper end of the corresponding pipe 10 as a first pipe; and the coupling portion 32*c* is coupled to the back lower end of the corresponding pipe 12 as a second pipe.

With the first coupling section 31 coupled to the corresponding pipe 10, the first sealing portion 31*a* is continuous with the sealing surface 10*a* of the pair of sealing surfaces 10*a* and 10*b* of the pipe 10; and the first non-sealing portion 31*b* is continuous with the non-sealing surface 10*d* of the pair of non-sealing surfaces 10*c* and 10*d* of the pipe 10.

With the second coupling section 32 coupled to the corresponding pipe 12, the second sealing portion 32*a* is continuous with the sealing surface 12*b* of the pair of sealing surfaces 12*a* and 12*b* of the pipe 12; and the second non-sealing portion 32*b* is continuous with the non-sealing surface 12*c* of the pair of non-sealing surfaces 12*c* and 12*d* of the pipe 12.

Figure 11:
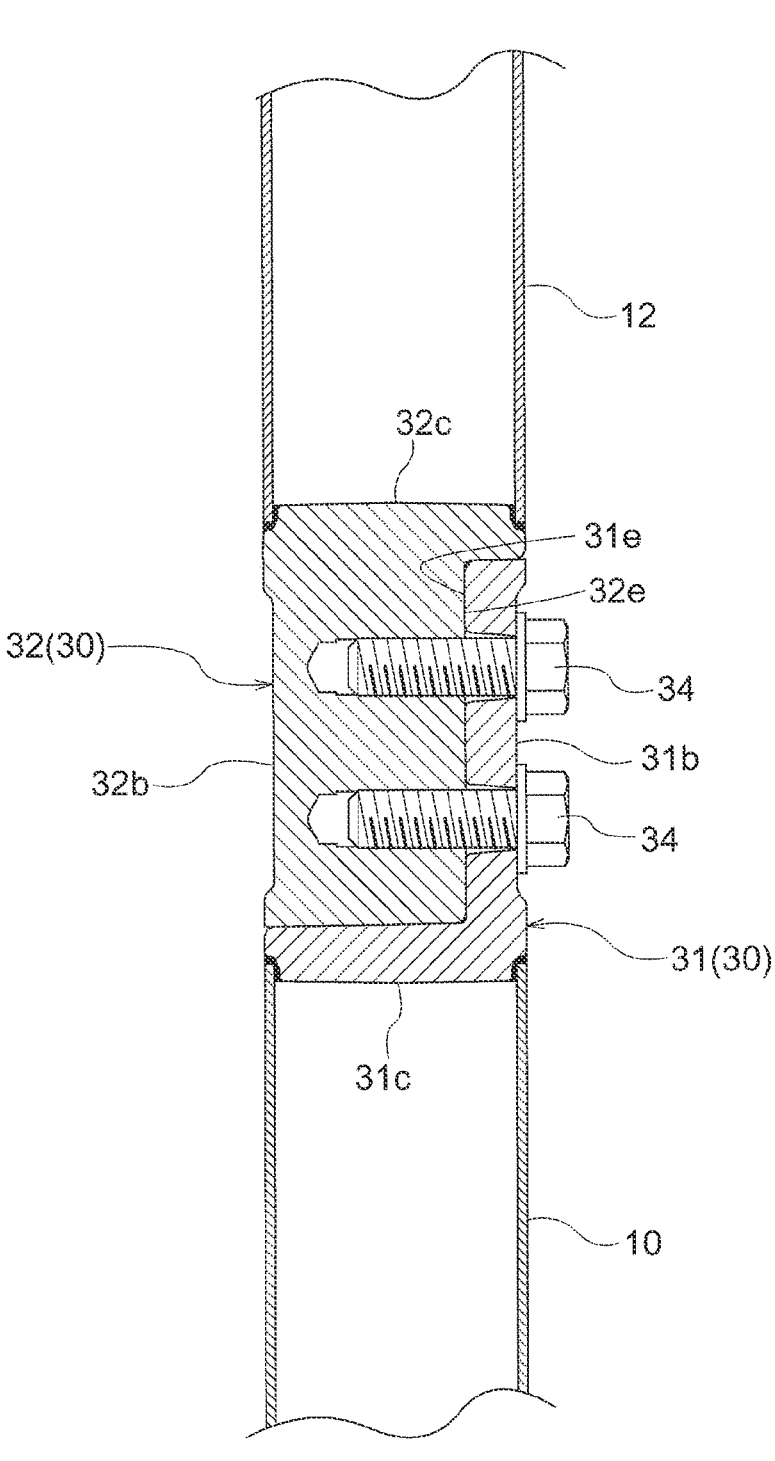
FIG. 11 is a cross-sectional view of the left-side rear joint and its nearby portion in FIG. 10 taken along line XI-XI in FIG. 10.
Figure 12:
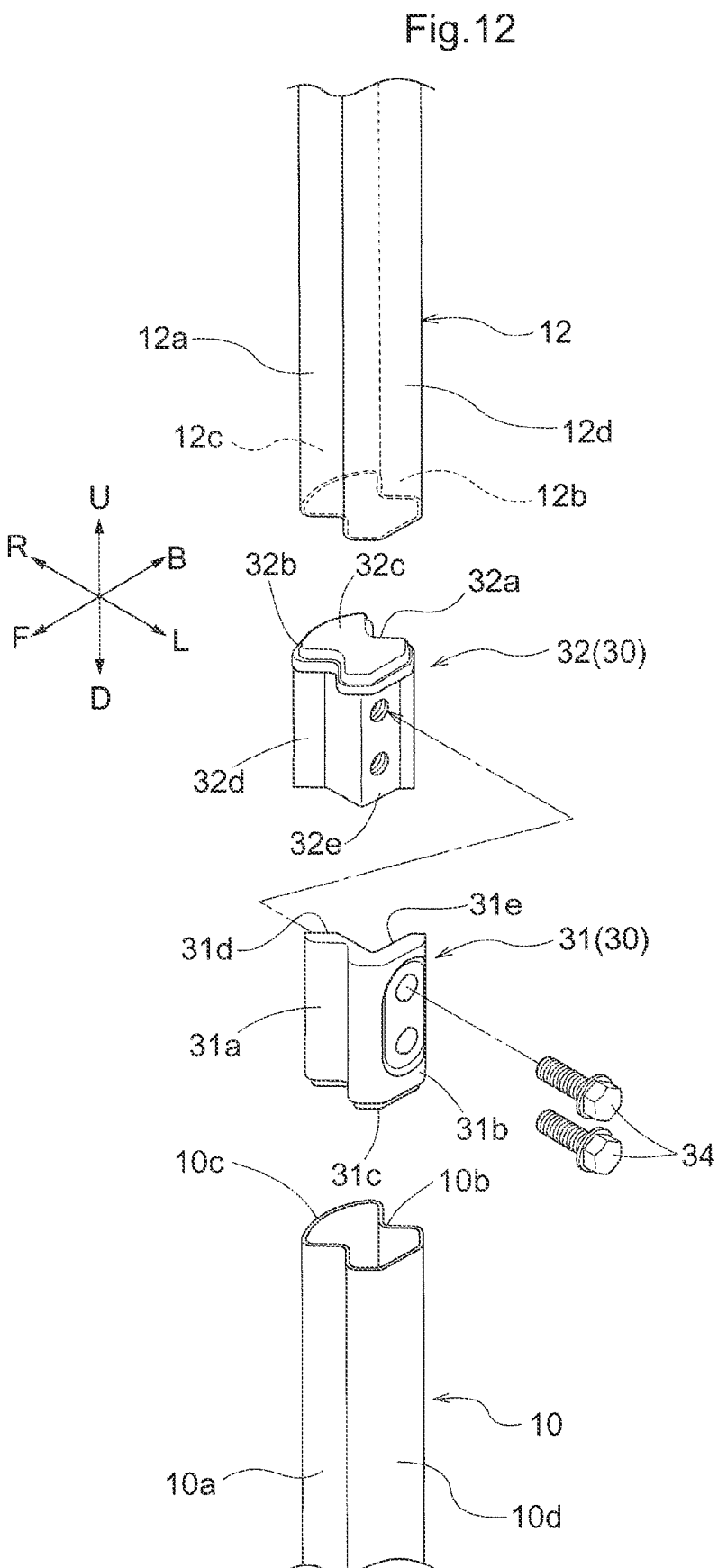
FIG. 12 is an exploded perspective view of a right-side rear joint and its nearby portion of a ROPS frame.
Figure 13:
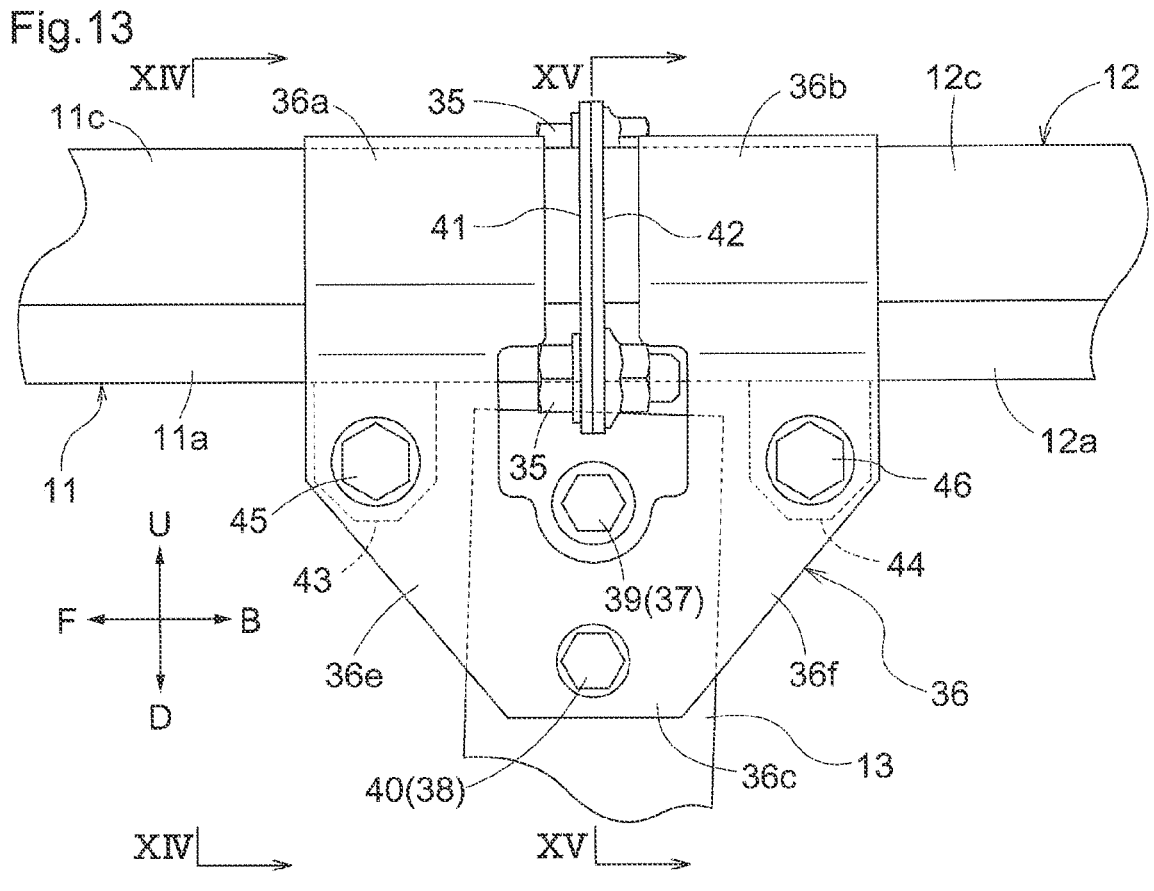
FIG. 13 is a left side view of a portion and its nearby portion of a ROPS frame at which the back upper end of a left pipe is coupled to the front upper end of another left pipe.

With the first coupling section 31 of each joint 30 coupled to the corresponding pipe 10 and the second coupling section 32 thereof coupled to the corresponding pipe 12 as described under "Configuration of Rear Joints" above, the first coupling section 31 (specifically, the first contact surface 31*d*) and the second coupling section 32 (specifically, the second contact surface 32*d*) are placed on each other as illustrated in FIGS. 10 and 11.

With the first coupling section 31 and the second coupling section 32 placed on each other, the protrusion 32*e* is in the depression 31*e*. The first coupling section 31 and the second coupling section 32 are coupled to each other with use of bolts 34.

In a cross-sectional view, the bolts 34 in the above state each extend through the protrusion 32*e* and the depression 31*e*, obliquely cross the first contact surface 31*d* and the second contact surface 32*d*, and are each in contact with the first non-sealing portion 31*b* and the second non-sealing portion 32*b*.

As described above, the joints 30 are each configured such that coupling the first coupling section 31 and the second coupling section 32 to each other results in the pipes 10 and 12 being coupled to each other with use of the joint 30 (namely, the first coupling section 31 and the second coupling section 32) in such a manner that the back upper end and the back lower end face each other.

Positional Relationships Between Rear Joints and Pipes

As illustrated in FIGS. 5, 6, 10, and 12, with the first coupling section 31 and the second coupling section 32 of each joint 30 coupled to each other, the first coupling section 31, the second coupling section 32, and the corresponding pipes 10 and 12 are positionally related to one another as described below.

Coupling the first coupling section 31 to the second coupling section 32 results in the first sealing portion 31a being continuous with the sealing surface 12a of the pair of sealing surfaces 12a and 12b of the corresponding pipe 12.

As described under "Coupling of Rear Joints" above, the first sealing portion 31a is continuous with the sealing surface 10a of the pair of sealing surfaces 10a and 10b of the corresponding pipe 10.

This allows the sealing surface 10a of the pipe 10 to be continuous with the sealing surface 12a of the corresponding pipe 12 with use of the first sealing portion 31a.

When, as a result of closing each rear door 19, the sealer 27 thereof is in contact with the respective sealing surfaces 10a and 12a of the corresponding pipes 10 and 12 as described under "How Pipes Are Related to Windshield, Front Doors, and Rear Doors" above, the sealer 27 is also in contact with the first sealing portion 31a.

Coupling the first coupling section 31 to the second coupling section 32 results in the second sealing portion 32a being continuous with the sealing surface 10b of the pair of sealing surfaces 10a and 10b of the corresponding pipe 10.

As described under "Coupling of Rear Joints" above, the second sealing portion 32a is continuous with the sealing surface 12b of the pair of sealing surfaces 12a and 12b of the corresponding pipe 12.

This allows the sealing surface 10b of the corresponding pipe 10 to be continuous with the sealing surface 12b of the pipe 12 with use of the second sealing portion 32a.

When, as a result of closing rear glass window 9, the sealer 29 thereof is in contact with the respective sealing surfaces 10b and 12b of the pipes 10 and 12 on each side as described under "How Pipes Are Related to Windshield, Front Doors, and Rear Doors" above, the sealer 29 is also in contact with the second sealing portion 32a.

Coupling the first coupling section 31 to the second coupling section 32 results in (i) the first non-sealing portion 31b being continuous with the non-sealing surface 12d of the corresponding pipe 12 and (ii) the second non-sealing portion 32b being continuous with the non-sealing surface 10c of the corresponding pipe 10.

As described under "Coupling of Rear Joints" above, the first non-sealing portion 31b is continuous with the non-sealing surface 10d of the pair of non-sealing surfaces 10c and 10d of the corresponding pipe 10; and the second non-sealing portion 32b is continuous with the non-sealing surface 12c of the pair of non-sealing surfaces 12c and 12d of the corresponding pipe 12.

This allows the non-sealing surface 10c of the pipe 10 to be continuous with the non-sealing surface 12c of the pipe 12 with use of the second non-sealing portion 32b, and also allows the non-sealing surface 10d of the pipe 10 to be continuous with the non-sealing surface 12d of the pipe 12 with use of the first non-sealing portion 31b of the first coupling section 31.

How Pipes and Frame Members of ROPS Frame are Structurally Coupled

The description below deals with that portion at which are coupled to one another (i) the back upper end of each pipe 11 as a first pipe (on the left side as an example; similar descriptions apply also to the right side), (ii) the front upper end of the corresponding pipe 12 as a second pipe", (iii) the upper end of the corresponding frame member 13 as a first frame member, and (iv) the corresponding end of the frame member 14 as a second frame member.

As illustrated in FIGS. 2, 3, 5, 6, and 13 to 16, the ROPS frame 7 includes a plate-shaped first joint 41 and a plate-shaped second joint 42. The first joint 41 is welded to the back upper end of the pipe 11 and oriented orthogonally to the longitudinal direction of the upper portion of the pipe 11. The second joint 42 is welded to the front upper end of the pipe 12 and oriented orthogonally to the longitudinal direction of the upper portion of the pipe 12.

The first and second joints 41 and 42 are placed on each other in such a manner that the back upper end of the pipe 11 and the front upper end of the pipe 12 face each other. The first and second joints 41 and 42 are provided with bolts 35 extending therethrough and fastening the first and second joints 41 and 42 to each other. The back upper end of the pipe 11 and the front upper end of the pipe 12 are thereby coupled to each other with use of the first and second joints 41 and 42 and the bolts 35.

The frame member 13 extends in the up-down direction, which crosses the respective upper portions of the pipes 11 and 12. The frame member 13 has an upper end facing the back upper end of the pipe 11 and the front upper end of the pipe 12.

The frame member 14 extends in the left-right direction, which crosses the respective upper portions of the pipes 11 and 12 and the upper portion of the frame member 13. The frame member 14 has a left (right) end facing the back upper end of the pipe 11 and the front upper end of the pipe 12.

The ROPS frame 7 includes a coupling member 36 (see FIG. 17) coupling to one another (i) the back upper end of the pipe 11, (ii) the front upper end of the pipe 12, (iii) the upper end of the frame member 13, and (iv) the left (right) end of the frame member 14 as described under "Structure of Coupling Member", "Coupling with Use of Coupling Member", and "Coupling of Coupling Member" below.

Structure of Coupling Member

Figure 17:
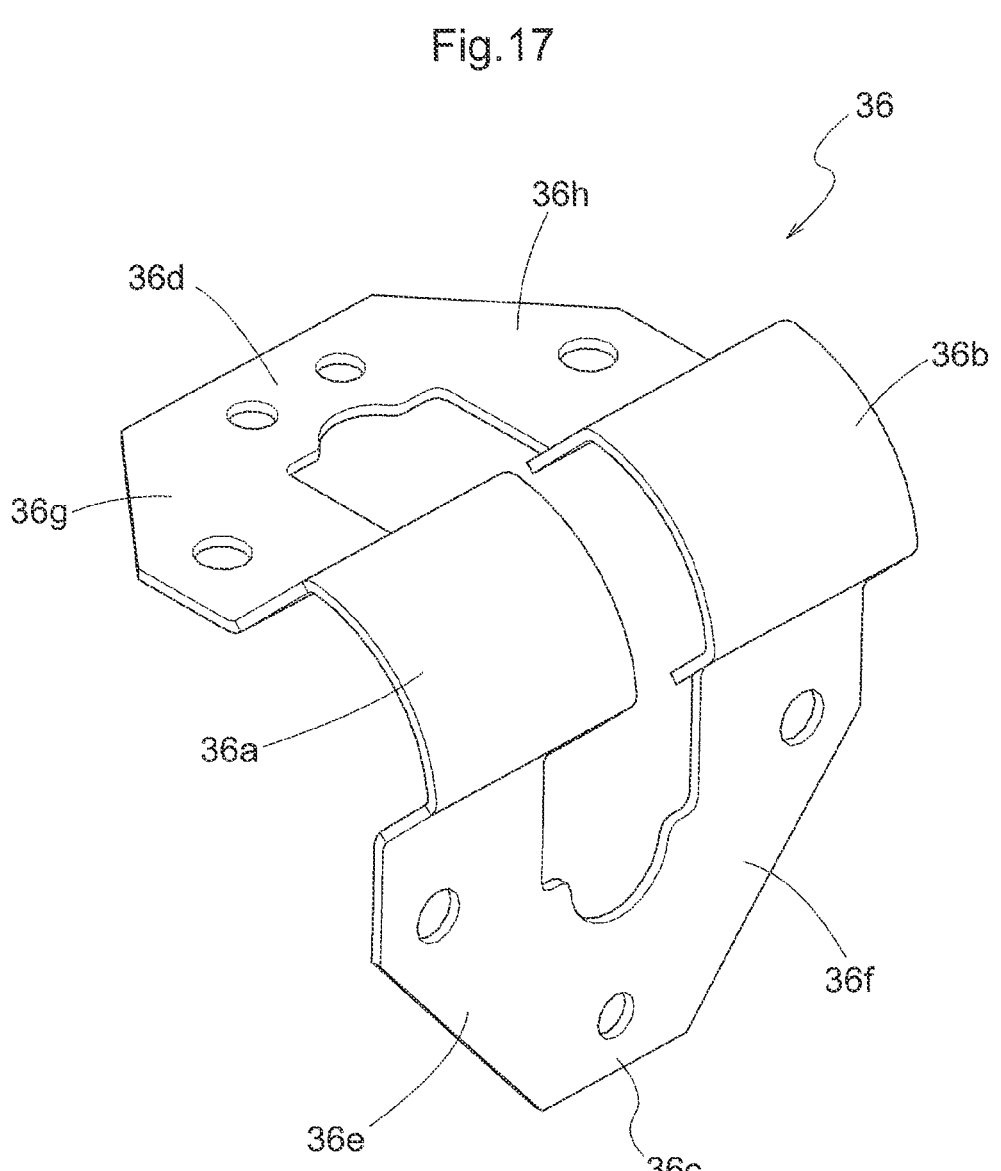
FIG. 17 is a perspective view of a coupling member.

As illustrated in FIG. 17, the coupling member 36 is in the form of a bent plate. The coupling member 36 includes four coupling sections 36a, 36b, 36c, and 36d and four connection sections 36e, 36f, 36g, and 36h. The connection section 36e extends between the coupling sections 36a and 36c. The connection section 36f extends between the coupling sections 36b and 36c. The connection section 36g extends between the coupling sections 36a and 36d. The connection section 36h extends between the coupling sections 36b and 36d.

The coupling member 36 is configured such that the coupling sections 36a and 36b are each bent in the shape of a depression and are apart from each other with a space in-between and that the connection sections 36e and 36g are apart from the connection sections 36f and 36h with a space in-between.

Coupling with Use of Coupling Member

As illustrated in FIGS. 13 to 17, the upper end of the frame member 13 is provided with a pair of collars 37 and

38 welded thereto, while the left (right) end of the frame member 14 is coupled to the collar 37 with use of a bolt 39. This results in coupling between the upper end of the frame member 13 and the left (right) end of the frame member 14.

The ROPS frame 7 includes a first auxiliary coupling member 43 and a second auxiliary coupling member 44 each in the form of a bent plate. The first auxiliary coupling member 43 is welded to the back upper end of the pipe 11, while the second auxiliary coupling member 44 is welded to the front upper end of the pipe 12.

The connection section 36c is coupled to the collar 38 with use of a bolt 40 to thereby be coupled to the upper end of the frame member 13. The connection section 36d is coupled to the left (right) end of the frame member 14 with use of bolts 47.

With the back upper end of the pipe 11 fitted in the connection section 36a, the coupling section 36a and the first auxiliary coupling member 43 are provided with a bolt 45 extending therethrough and fastening the connection section 36a to the first auxiliary coupling member 43. This results in the back upper end of the pipe 11 being coupled to the connection section 36a.

With the front upper end of the pipe 12 fitted in the connection section 36b, the coupling section 36b and the second auxiliary coupling member 44 are provided with a bolt 46 extending therethrough and fastening the connection section 36b to the second auxiliary coupling member 44. This results in the front upper end of the pipe 12 being coupled to the connection section 36b.

The coupling sections 36a and 36b are coupled respectively to the back upper end of the pipe 11 and to the front upper end of the pipe 12 in such a manner that the coupling section 36a and the first auxiliary coupling member 43 cover the back upper end of the pipe 11 and that the coupling section 36b and the second auxiliary coupling member 44 cover the front upper end of the pipe 12.

The first auxiliary coupling member 43 and the second auxiliary coupling member 44 may alternatively be uncoupled respectively from the back upper end of the pipe 11 and from the front upper end of the pipe 12.

Coupling of Coupling Member

As described under "Structure of Coupling Member" and "Coupling with Use of Coupling Member" above and illustrated in FIGS. 13 to 17, the coupling sections 36a and 36c and the connection section 36e are coupled to the back upper end of the pipe 11 and the upper end of the frame member 13; and the coupling sections 36b and 36c and the connection section 36f are coupled to the front upper end of the pipe 12 and the upper end of the frame member 13.

Further, the coupling sections 36a and 36d and the connection section 36g are coupled to the back upper end of the pipe 11 and the left (right) end of the frame member 14; and the coupling sections 36b and 36d and the connection section 36h are coupled to the front upper end of the pipe 12 and the left (right) end of the frame member 14.

As described under "Structure of Coupling Member" above, the coupling member 36 is configured such that the coupling sections 36a and 36b are apart from each other and that the connection sections 36e and 36g are apart from the connection sections 36f and 36h. The left (right) end of the frame member 14 has an opening 14a (see FIG. 5).

The back upper end of the pipe 11 and the front upper end of the pipe 12 face each other at a portion (in other words, the first and second joints 41 and 42 and the bolts 35) that is (i) between the coupling sections 36a and 36b, (ii) between the connection sections 36e and 36g and the connection sections 36f and 36h, and (iii) in the opening 14a.

First Alternative Embodiment

The back upper end of the pipe 11 and the front upper end of the pipe 12 may be structurally coupled to each other with use of the first and second joints 41 and 42 as described below.

Figure 18:
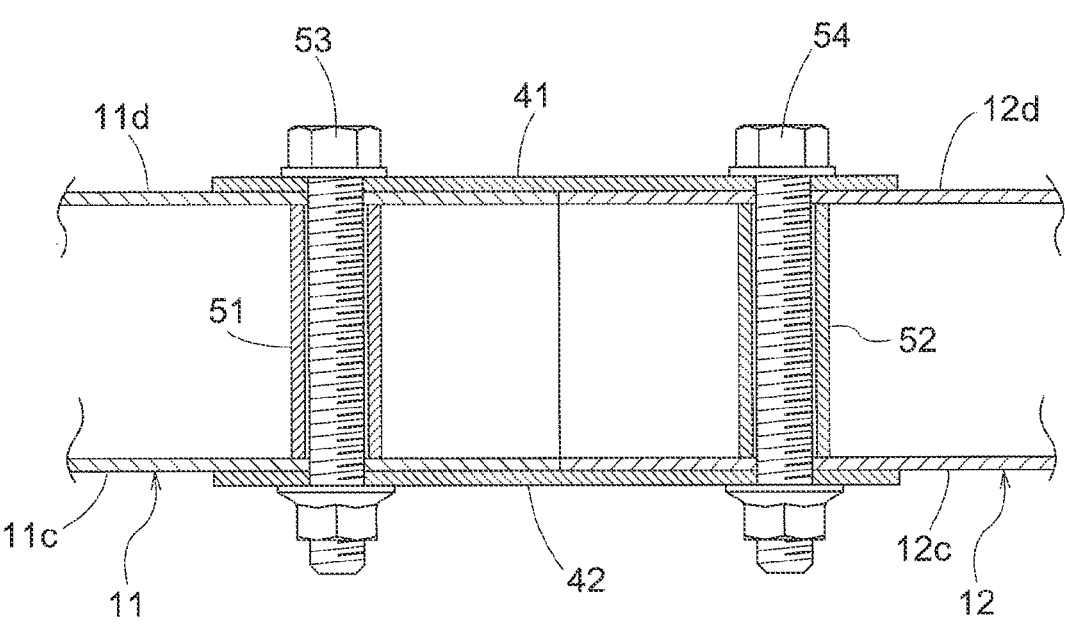
FIG. 18 is a side cross-sectional view of a portion and its nearby portion of a ROPS frame as a first alternative embodiment at which the back upper end of a pipe is coupled to the front upper end of another pipe.

As illustrated in FIG. 18, this embodiment includes a plate-shaped first joint 41 that is, with the back upper end of the pipe 11 facing the front upper end of the pipe 12, placed on the non-sealing surface 11d (outer surface) of the back upper end of the pipe 11 and the non-sealing surface 12d (outer surface) of the front upper end of the pipe 12.

This embodiment also includes a plate-shaped second joint 42 placed on the non-sealing surface 11c (outer surface) of the back upper end of the pipe 11 and the non-sealing surface 12c (outer surface) of the front upper end of the pipe 12. The first and second joints 41 and 42 are opposite to each other in a cross-sectional view of the pipes 11 and 12.

This embodiment includes a first collar 51 that has a cylindrical shape, that is inside the back upper end of the pipe 11, and that is attached to that portion of the non-sealing surface 11d which faces the first joint 41 and to that portion of the non-sealing surface 11c which faces the second joint 42.

This embodiment includes a second collar 52 that has a cylindrical shape, that is inside the front upper end of the pipe 12, and that is attached to that portion of the non-sealing surface 12d which faces the first joint 41 and to that portion of the non-sealing surface 12c which faces the second joint 42.

This embodiment includes a first bolt 53 extending through the first and second joints 41 and 42 and the first collar 51 and fastening the first and second joints 41 and 42 toward each other.

This embodiment includes a second bolt 54 extending through the first and second joints 41 and 42 and the second collar 52 and fastening the first and second joints 41 and 42 toward each other.

The above configuration allows the back upper end of the pipe 11 and the front upper end of the pipe 12 to be coupled to each other with use of the first and second joints 41 and 42 and the first and second bolts 53 and 54.

Figure 14:
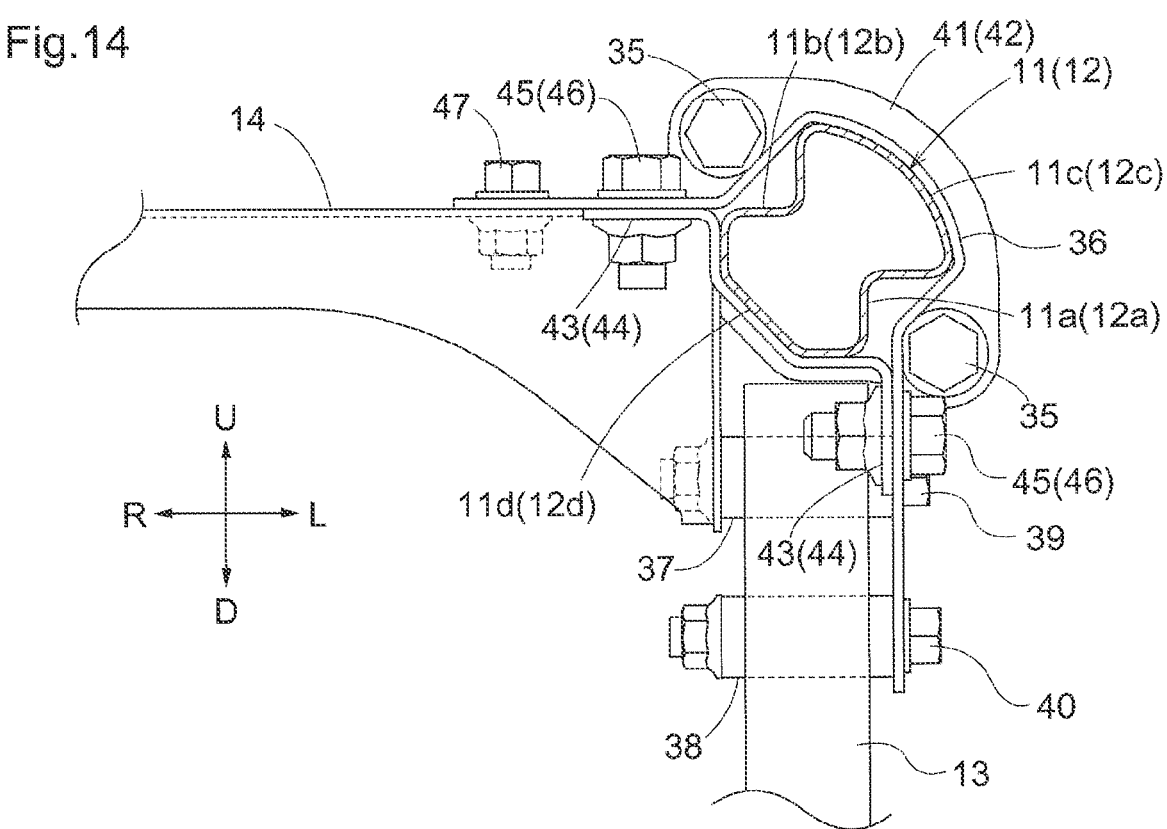
FIG. 14 is a cross-sectional view of the portion and its nearby portion in FIG. 13 taken along line XIV-XIV in FIG. 13.
Figure 15:
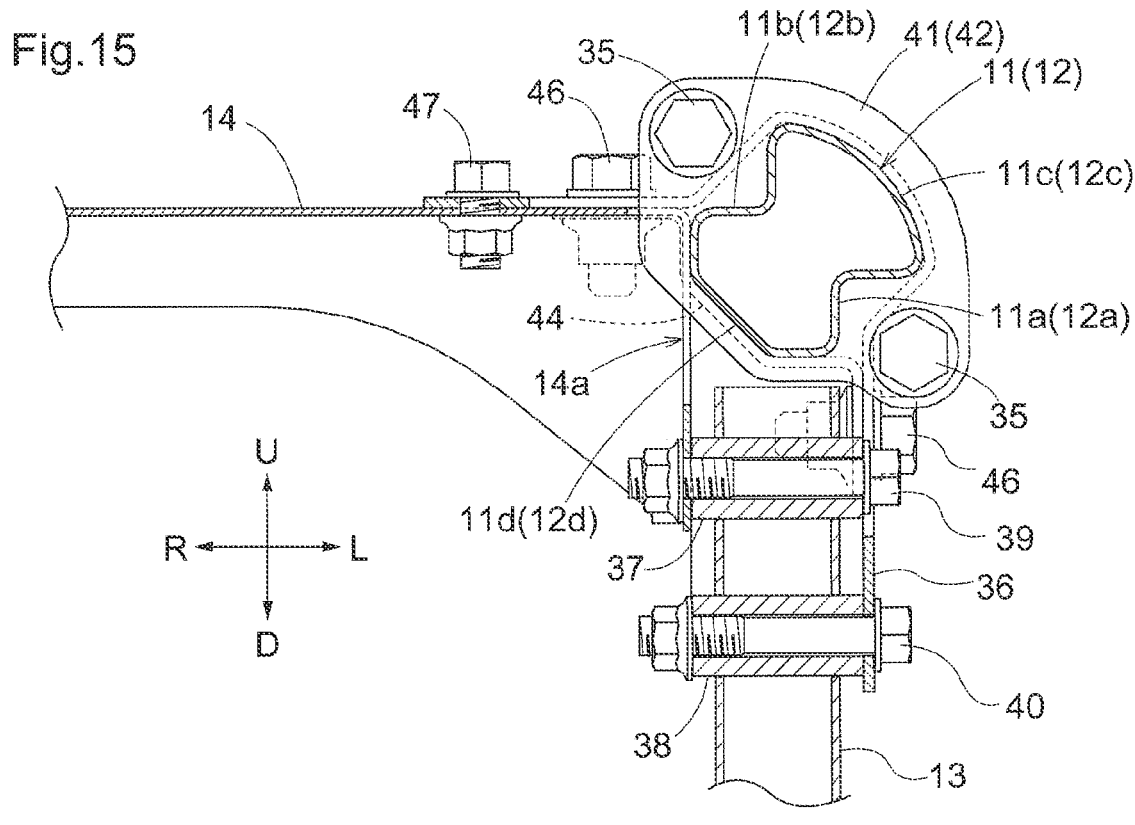
FIG. 15 is a cross-sectional view of the portion and its nearby portion in FIG. 13 taken along line XV-XV in FIG. 13.
Figure 16:
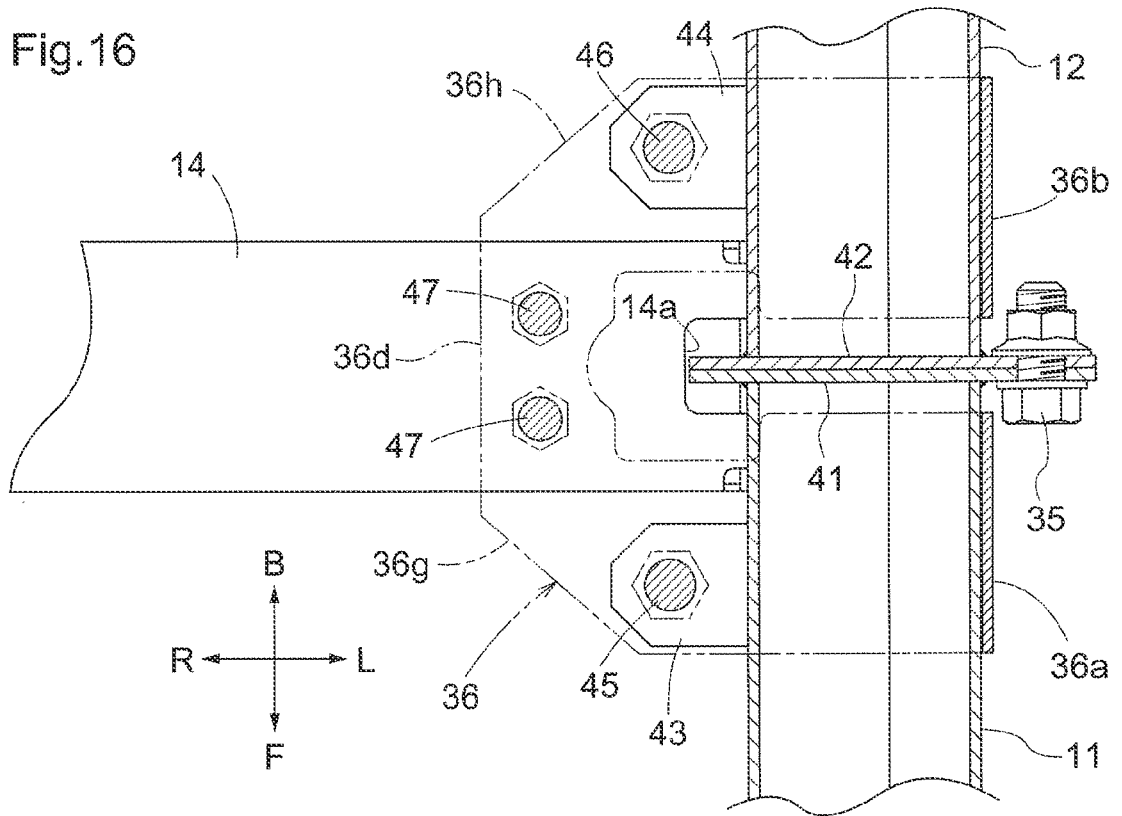
FIG. 16 is a plan cross-sectional view of a portion and its nearby portion of a ROPS frame at which the back upper end of a left pipe is coupled to the front upper end of another left pipe.

In a case where the pipes 11 and 12 each have a circular cross-sectional shape unlike in FIGS. 14 and 15, the first and second joints 41 and 42 may together be a cylinder. With this configuration, the cylinder has a portion as the first joint 41 and another portion as the second joint 42 that is shifted in phase by 180 degrees from the first joint 41.

Second Alternative Embodiment

This embodiment is configured as described under "First Alternative Embodiment" above and illustrated in FIG. 18, and includes frame members 13 and 14 illustrated in FIGS. 13 to 16 as described below.

Figure 19:
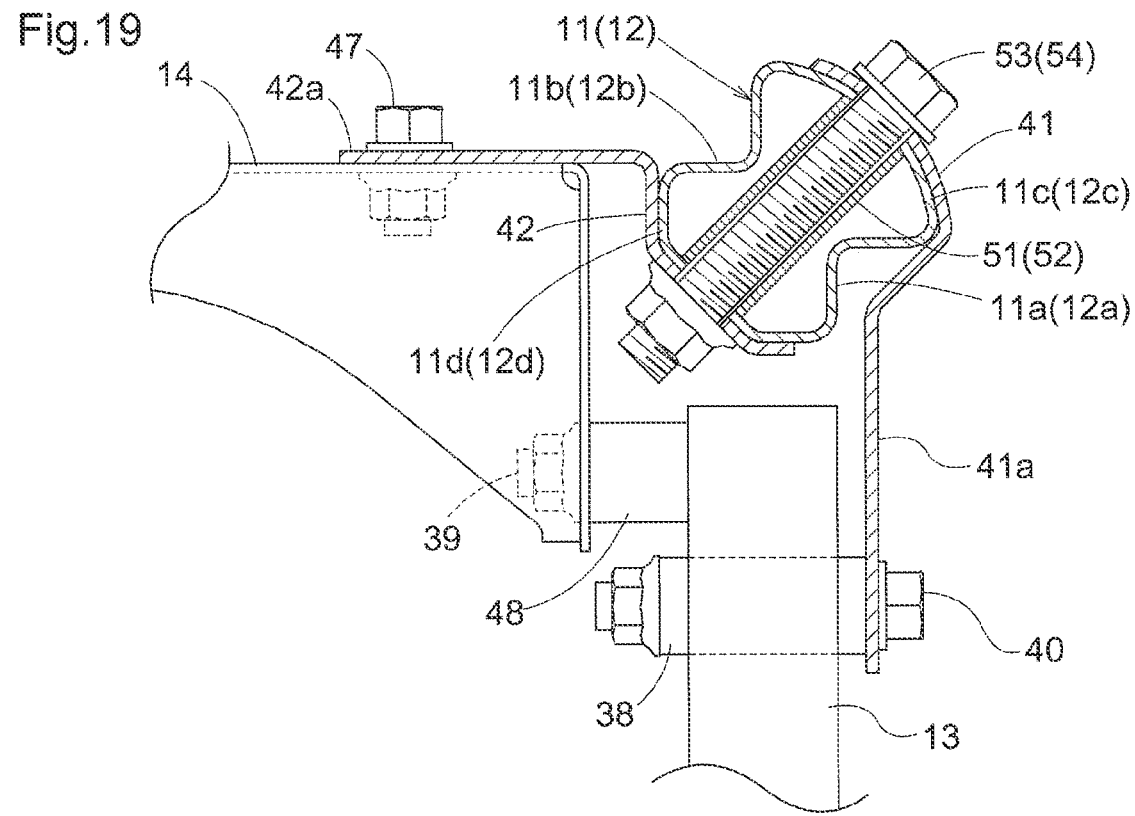
FIG. 19 is a front cross-sectional view of a portion and its nearby portion of a ROPS frame as a second alternative embodiment at which the back upper end of a pipe is coupled to the front upper end of another pipe.

As illustrated in FIG. 19, this embodiment is configured such that the first joint 41 includes a coupling section 41a extending therefrom downward and coupled to the collar 38 (hence to the frame member 13) with use of a bolt 40 and that the second joint 42 includes a coupling section 42a extending therefrom laterally and coupled to the frame member 14 with use of bolts 47.

The frame member 13 is not provided with the collar 37 illustrated in FIGS. 14 and 15, and is provided with an internally threaded boss 48 welded to the upper end thereof.

The frame member 14 is coupled to the boss 48 (hence to the frame member 13) with use of a bolt 39.

This configuration allows the first and second joints 41 and 42 to perform the function of the coupling member 36 illustrated in FIGS. 13 to 17, thereby eliminating the need to includes a separate coupling member 36.

Third Alternative Embodiment

The back upper end of the pipe 11 and the front upper end of the pipe 12 may be structurally coupled to each other with use of the first and second joints 41 and 42 as described below.

Figure 20:
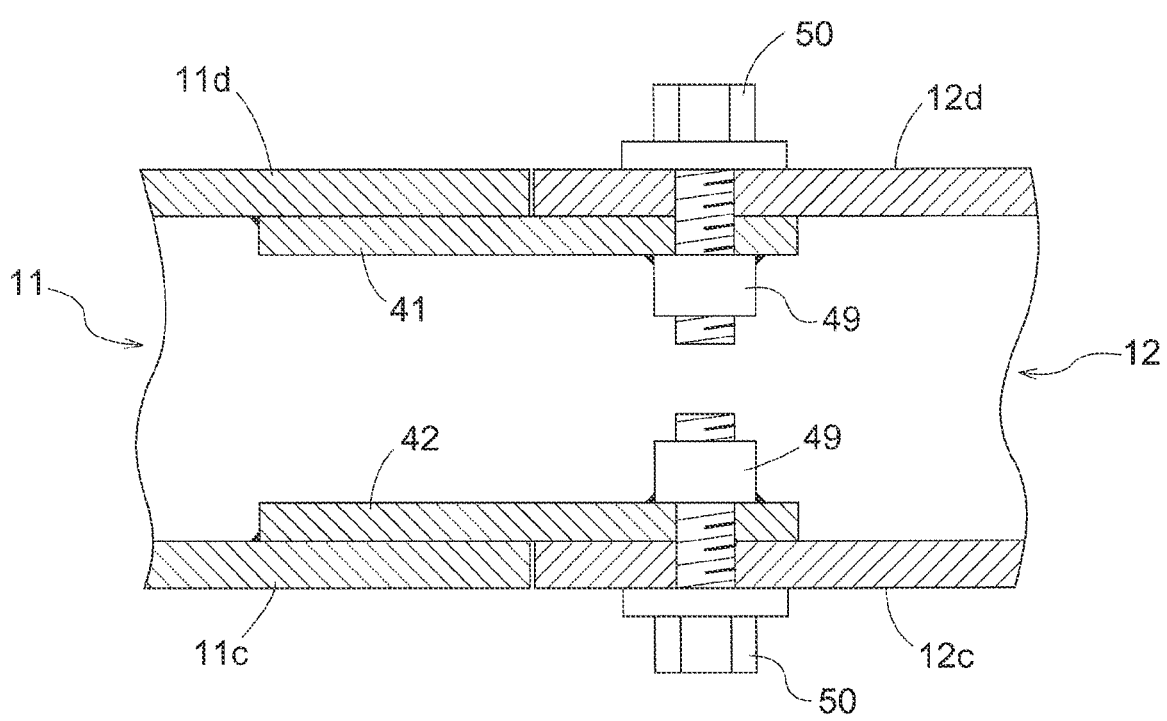
FIG. 20 is a side cross-sectional view of a portion and its nearby portion of a ROPS frame as a third alternative embodiment at which the back upper end of a pipe is coupled to the front upper end of another pipe.

As illustrated in FIG. 20, this embodiment includes a plate-shaped first joint 41 with a first portion welded to the inner surface (non-sealing surface 11d) of the back upper end of the pipe 11 and a second portion protruding from the back upper end of the pipe 11. This embodiment also includes a nut 49 welded to the inner surface of the second portion of the first joint 41.

This embodiment includes a plate-shaped second joint 42 with a first portion welded to the inner surface (non-sealing surface 11c) of the back upper end of the pipe 11 and a second portion protruding from the back upper end of the pipe 11. This embodiment also includes a nut 49 welded to the inner surface of the second portion of the second joint 42. The first and second joints 41 and 42 are opposite to each other in a cross-sectional view of the pipes 11 and 12.

The respective second portions of the first and second joints 41 and 42 are inserted in the front upper end of the pipe 12, so that the back upper end of the pipe 11 and the front upper end of the pipe 12 face each other. This embodiment includes two bolts 50 screwed in the respective nuts 49 on the first and second joints 41 and 42 from outward of the front upper end of the pipe 12 and fastening the pipe 12 to the first and second joints 41 and 42.

The above configuration allows the back upper end of the pipe 11 and the front upper end of the pipe 12 to be coupled to each other with use of the first and second joints 41 and 42, the bolts 50, and the nuts 49.

Fourth Alternative Embodiment

This embodiment is configured as described under "Third Alternative Embodiment" above and illustrated in FIG. 20, and is altered such that the first and second joints 41 and 42 have respective first portions each welded to the inner surfaces (non-sealing surfaces 12d and 12c) of the front upper end of the pipe 12 and respective second portions each protruding from the front upper end of the pipe 12. With this configuration, the pipe 12 serves as the first pipe, whereas the pipe 11 serves as the second pipe.

In a case where the first joint 41 has a first portion coupled to the inner surface (non-sealing surface 11d) of the back upper end of the pipe 11 as described under "Third Alternative Embodiment" above and illustrated in FIG. 20, the second joint 42 may have a first portion coupled to the inner surface of the front upper end of the pipe 12 and a second portion protruding from the front upper end of the pipe 12.

In a case where the pipes 11 and 12 each have a circular cross-sectional shape unlike in FIGS. 14 and 15, this embodiment may include, in addition to the first and second joints 41 and 42, a third joint and a nut as well as a fourth joint and a nut.

In a case where the pipes 11 and 12 each have a circular cross-sectional shape unlike in FIGS. 14 and 15, the first and second joints 41 and 42 may together be a cylinder. With this configuration, the cylinder has a portion as the first joint 41 and other portions as the second joint 42 and the third and fourth joints that are shifted in phase from the first joint 41.

Fifth Alternative Embodiment

In a case where the first and second joints 41 and 42 cannot be provided to extend along the entire circumference of the respective ends of the pipes 11 and 12 as illustrated in FIGS. 13 to 16, the back upper end of the pipe 11 and the front upper end of the pipe 12 may be structurally coupled to each other with use of the first and second joints 41 and 42 as described below.

Figure 21:
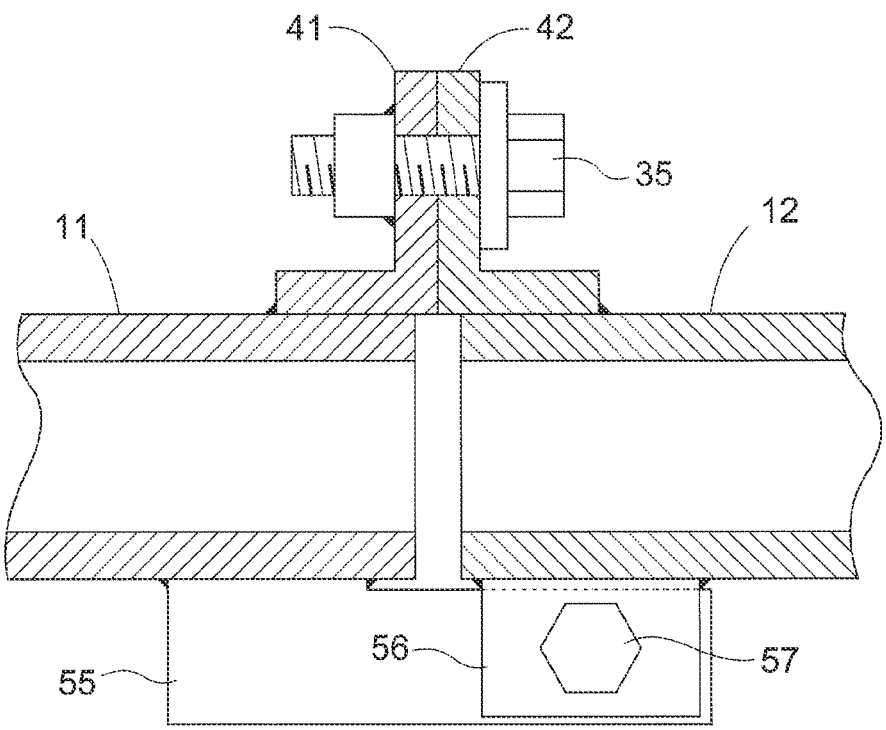
FIG. 21 is a side cross-sectional view of a portion and its nearby portion of a ROPS frame as a fifth alternative embodiment at which the back upper end of a pipe is coupled to the front upper end of another pipe.

As illustrated in FIG. 21, this embodiment includes a plate-shaped first joint 41 and a plate-shaped second joint 42 each angled in cross section and having an area of about a quadrant of the cross section of the pipes 11 and 12. The first and second joints 41 and 42 are welded to the respective outer surfaces of the respective ends of the pipes 11 and 12 and oriented orthogonally to the longitudinal direction of the pipes 11 and 12.

This embodiment includes a plate-shaped third joint 55 extending in the longitudinal direction of the pipes 11 and 12. The third joint 55 has a first portion welded to the outer surface of the back upper end of the pipe 11 and a second portion protruding from the back upper end of the pipe 11.

This embodiment also includes a plate-shaped fourth joint 56 extending in the longitudinal direction of the pipes 11 and 12 and welded to the outer surface of the front upper end of the pipe 12.

The first and second joints 41 and 42 are placed on each other in such a manner that the back upper end of the pipe 11 and the front upper end of the pipe 12 face each other. The first and second joints 41 and 42 are provided with bolts 35 extending therethrough and fastening the first and second joints 41 and 42 to each other.

The second portion of the third joint 55 and the fourth joint 56 are placed on each other. The third and fourth joints 55 and 56 are provided with a bolt 57 extending therethrough and fastening the third and fourth joints 55 and 56 to each other.

The back upper end of the pipe 11 and the front upper end of the pipe 12 are thereby coupled to each other with use of the first and second joints 41 and 42, the third and fourth joints 55 and 56, and the bolts 35 and 57.

This embodiment may be altered such that the third joint 55 is coupled to the pipe 12 and that the fourth joint 56 is coupled to the pipe 11.

Sixth Alternative Embodiment

FIGS. 13 to 16 and the first to fourth alternative embodiments each involve a first joint 41 structurally coupled to a second joint 42. This coupling structure may be applied to the coupling between the front upper end of the pipe 10 and the front lower end of the pipe 11 and/or to the coupling between the back upper end of the pipe 10 and the back lower end of the pipe 12.

FIGS. 7 to 12 each illustrate a joint 20 structurally coupled to a joint 30. This coupling structure may be applied to the coupling between the back upper end of the pipe 11 and the front upper end of the pipe 12.

The present invention is applicable to a joint of a ROPS frame for not only a multipurpose work vehicle but also a riding-type mower, a tractor, and the like.

The invention claimed is:

1. A joint for a first pipe and a second pipe of a roll-over protective structure (ROPS) frame, the first and second pipes each comprising on an outer side:

a first sealing surface and a second sealing surface each for contact with a sealer and opposite to each other in a cross-sectional view; and a first non-sealing surface and a second non-sealing surface opposite to each other in a cross-sectional view and each disposed between the corresponding first and second sealing surfaces, wherein the joint is configured to couple an end of the first pipe and an end of the second pipe to each other such that the respective ends of the first and second pipes face each other and such that the first and second sealing surfaces of the first pipe are continuous, respectively, with the first and second sealing surfaces of the second pipe, the joint comprising:

a first coupling section configured to be coupled to the end of the first pipe; and a second coupling section configured to be coupled to the end of the second pipe, the first coupling section comprising:

a first sealing portion configured to be continuous with the first sealing surface or the second sealing surface of the first pipe; and a first non-sealing portion configured to be continuous with the first non-sealing surface or the second non-sealing surface of the first pipe, the second coupling section comprising:

a second sealing portion configured to be continuous with the first sealing surface or the second sealing surface of the second pipe; and a second non-sealing portion configured to be continuous with the first non-sealing surface or the second non-sealing surface of the second pipe, wherein the first and second coupling sections are configured to be coupled to each other with use of a bolt extending, with the first and second coupling sections placed on each other, from the first non-sealing portion to the second non-sealing portion in a cross-sectional view, wherein the first coupling section has a first contact surface configured to, with the first and second coupling sections placed on each other, be in contact with the second coupling section, and the second coupling section has a second contact surface configured to, with the first and second coupling sections placed on each other, be in contact with the first coupling section, and wherein the first contact surface and the second contact surface each comprise:

a first portion extending along a longitudinal direction of the bolt and orthogonally to a longitudinal direction of the first coupling section between the first non-sealing portion and the second non-sealing portion; and a second portion connected to an end of the first portion and extending along a direction obliquely intersecting the bolt and a longitudinal direction of the second coupling section, wherein the first contact surface extends beyond the first portion and the second portion of the first contact surface, and wherein the second contact surface extends beyond the first portion and the second portion of the second contact surface.

2. The joint according to claim 1, wherein:

the second contact surface has a protrusion facing the first contact surface in a cross-sectional view and the protrusion is at least partially defined by the first portion of the second contact surface, the protrusion extends along a longitudinal direction of the second contact surface, the first contact surface has a depression configured to receive the protrusion in a cross-sectional view and the depression is at least partially defined by the first portion of the first contact surface, and with the first and second coupling sections placed on each other, the protrusion is in the depression.

3. The joint according to claim 2, wherein the depression is a portion of the first contact surface which portion is depressed toward the first non-sealing portion in a cross-sectional view.

4. The joint according to claim 2, wherein the bolt extends from the first non-sealing portion to the second non-sealing portion through the protrusion and the depression in a cross-sectional view.

5. A work vehicle, comprising:

a ROPS frame including a joint according to claim 1.

6. A joint for a first pipe and a second pipe of a roll-over protective structure (ROPS) frame, the first and second pipes each comprising on an outer side:

a first sealing surface and a second sealing surface each for contact with a sealer and opposite to each other in a cross-sectional view; and a first non-sealing surface and a second non-sealing surface opposite to each other in a cross-sectional view and each disposed between the corresponding first and second sealing surfaces, wherein the joint is configured to couple an end of the first pipe and an end of the second pipe to each other such that the respective ends of the first and second pipes face each other and such that the first and second sealing surfaces of the first pipe are continuous, respectively, with the first and second sealing surfaces of the second pipe, the joint comprising:

a first coupling section configured to be coupled to the end of the first pipe; and a second coupling section configured to be coupled to the end of the second pipe, the first coupling section comprising:

a first sealing portion configured to be continuous with the first sealing surface or the second sealing surface of the first pipe; and a first non-sealing portion configured to be continuous with the first non-sealing surface or the second non-sealing surface of the first pipe, the second coupling section comprising:

a second sealing portion configured to be continuous with the first sealing surface or the second sealing surface of the second pipe; and a second non-sealing portion configured to be continuous with the first non-sealing surface or the second non-sealing surface of the second pipe, wherein the first and second coupling sections are configured to be coupled to each other with use of a bolt extending, with the first and second coupling sections placed on each other, from the first non-sealing portion to the second non-sealing portion in a cross-sectional view, wherein the first coupling section has a first contact surface configured to, with the first and second coupling sections placed on each other, be in contact with the second coupling section, the second coupling section has a second contact surface configured to, with the first and second coupling sections placed on each other, be in contact with the first coupling section, the bolt extends from the first non-sealing portion to the second non-sealing portion in such a manner as to obliquely cross the first and second contact surfaces in a cross-sectional view, wherein the first contact surface and the second contact surface each comprise:

a first portion extending along a longitudinal direction of the bolt in a cross-sectional view along a diameter of the first and second pipes; and a second portion connected to an end of the first portion and extending along a direction obliquely intersecting the bolt and a direction parallel to a longitudinal direction of the pipes.

7. A joint for a first pipe and a second pipe of a roll-over protective structure (ROPS) frame, the first and second pipes each comprising on an outer side:

a first sealing surface and a second sealing surface each for contact with a sealer and opposite to each other in a cross-sectional view; and a first non-sealing surface and a second non-sealing surface opposite to each other in a cross-sectional view and each disposed between the corresponding first and second sealing surfaces, wherein the joint is configured to couple an end of the first pipe and an end of the second pipe to each other such that the respective ends of the first and second pipes face each other and such that the first and second sealing surfaces of the first pipe are continuous, respectively, with the first and second sealing surfaces of the second pipe, the joint comprising:

a first coupling section configured to be coupled to the end of the first pipe; and a second coupling section configured to be coupled to the end of the second pipe, the first coupling section comprising:

a first sealing portion configured to be continuous with the first sealing surface or the second sealing surface of the first pipe; and a first non-sealing portion configured to be continuous with the first non-sealing surface or the second non-sealing surface of the first pipe, the second coupling section comprising:

a second sealing portion configured to be continuous with the first sealing surface or the second sealing surface of the second pipe; and a second non-sealing portion configured to be continuous with the first non-sealing surface or the second non-sealing surface of the second pipe, wherein the first and second coupling sections are configured to be coupled to each other with use of a bolt extending, with the first and second coupling sections placed on each other, from the first non-sealing portion to the second non-sealing portion in a cross-sectional view, wherein the first coupling section has a first contact surface configured to, with the first and second coupling sections placed on each other, be in contact with the second coupling section, and the second coupling section has a second contact surface configured to, with the first and second coupling sections placed on each other, be in contact with the first coupling section, wherein the second contact surface has a protrusion from an end of the second contact surface toward the first non-sealing surface in a cross-sectional view along a diameter of the first and second pipes, wherein the protrusion extends along a longitudinal direction of the second contact surface, and the first contact surface has a depression from an end of the first contact surface toward the first non-sealing portion in the cross-sectional view along the diameter of the first and second pipes.

8. The joint according to claim 7, wherein an angle of the protrusion is a right angle in the cross-sectional view along the diameter of the first and second pipes.

* * * * *